(12) United States Patent
Arai et al.

(10) Patent No.: US 12,524,889 B2
(45) Date of Patent: Jan. 13, 2026

(54) INFERENCE APPARATUS AND LEARNING APPARATUS

(71) Applicant: Mitsubishi Electric Corporation, Tokyo (JP)

(72) Inventors: Akito Arai, Tokyo (JP); Katsuhiro Kusano, Tokyo (JP); Shogo Shimizu, Tokyo (JP); Seiji Okumura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 177 days.

(21) Appl. No.: 18/239,328

(22) Filed: Aug. 29, 2023

(65) Prior Publication Data

US 2023/0410322 A1    Dec. 21, 2023

Related U.S. Application Data

(63) Continuation of application No. PCT/JP2021/015344, filed on Apr. 13, 2021.

(51) Int. Cl.
*G06T 7/20* (2017.01)
*G06T 7/50* (2017.01)
(Continued)

(52) U.S. Cl.
CPC .............. *G06T 7/20* (2013.01); *G06T 7/50* (2017.01); *G06T 7/70* (2017.01); *G06T 11/206* (2013.01);
(Continued)

(58) Field of Classification Search
CPC .... G06T 7/20; G06T 7/50; G06T 7/70; G06T 11/206; G06T 2207/20081;
(Continued)

(56) References Cited

U.S. PATENT DOCUMENTS

2006/0029277 A1    2/2006   Funayama
2008/0056582 A1    3/2008   Funayama
(Continued)

FOREIGN PATENT DOCUMENTS

CN      111783739 A      10/2020
CN      112212861 A       1/2021
(Continued)

OTHER PUBLICATIONS

International Search Report, issued in PCT/JP2021/015344, PCT/ISA/210, dated Jul. 13, 2021.
(Continued)

*Primary Examiner* — Devona E Faulk
(74) *Attorney, Agent, or Firm* — Birch, Stewart, Kolasch & Birch, LLP

(57) ABSTRACT

A shape similarity computation unit (2021) computes, as a shape similarity, a similarity in shape between a learning movement path curve which is a movement path curve obtained through learning and an observation movement path curve which is a movement path curve obtained through observation. A position similarity computation unit (2022) computes, as a position similarity, a similarity in position between the learning movement path curve and the observation movement path curve when the learning movement path curve and the observation movement path curve are placed in a same coordinate space. A conformity computation unit (203) computes a conformity between the learning movement path curve and the observation movement path curve, using the shape similarity and the position similarity.

16 Claims, 19 Drawing Sheets

(51) Int. Cl.
*G06T 7/70* (2017.01)
*G06T 11/20* (2006.01)

(52) U.S. Cl.
CPC ............... *G06T 2207/20081* (2013.01); *G06T 2207/30241* (2013.01)

(58) Field of Classification Search
CPC .......... G06T 2207/30241; G06F 18/25; G06V 10/62; G06V 10/761; G06V 10/80; G06V 20/52; G06V 40/28
See application file for complete search history.

(56) References Cited

U.S. PATENT DOCUMENTS

| | | | | |
|---|---|---|---|---|
| 2008/0253662 | A1* | 10/2008 | Funaki | G06V 40/16 382/209 |
| 2012/0290173 | A1 | 11/2012 | Irie | |
| 2020/0074380 | A1 | 3/2020 | Mori et al. | |

FOREIGN PATENT DOCUMENTS

| | | |
|---|---|---|
| EP | 3916654 A1 | 12/2021 |
| JP | 2004-118290 A | 4/2004 |
| JP | 2004-310606 A | 11/2004 |
| JP | 2016-115110 A | 6/2016 |
| JP | 2016-170603 A | 9/2016 |
| JP | 2020-34849 A | 3/2020 |
| JP | 2020-119164 A | 8/2020 |
| JP | 2020-528365 A | 9/2020 |
| KR | 100188534 B1 * | 6/1999 ............... G06T 9/20 |
| WO | WO 2011/086684 A1 | 7/2011 |
| WO | WO 2021/130978 A1 | 7/2021 |

OTHER PUBLICATIONS

Beh et al., "Rule-based trajectory segmentation for modeling hand motion trajectory," Pattern Recognition, vol. 47, 2014, pp. 1586-1601.
Extended European Search Report for European Application No. 21936926.1, dated Apr. 9, 2024.
Kong et al., "Sign Language Phoneme Transcription with Rule-based Hand Trajectory Segmentation," J Sign Process Syst, vol. 59, 2010, pp. 211-222.
Porikli, "Trajectory Distance Metric Using Hidden Markov Model Based Representation," Mitsubishi Electric Research Laboratories, TR2004-030, Nov. 2004, 10 pages total.
Cai et al., "Indexing Spatio-Temporal Trajectories with Chebyshev Polynomials," Proceedings of the ACM, SIGMOD International Conference on Management Data, Jun. 13-18, 2004, XP058112821, pp. 1-12.
European Office Action for European Application No. 21 936 926.1, dated Sep. 26, 2024.
Yanagisawa et al., "Shape-Based Similarity Query for Trajectory of Mobile Objects," NTT Communication Science Laboratories, European Conference on Computer Vision, vol. 2574, Jan. 1, 2023, XP093206994, pp. 1-15.
Chinese Office Action and Search Report for Chinese Application No. 202180096585.X, dated Jun. 26, 2025, with English translation of the Office Action.

* cited by examiner

Fig.14

COMPUTATION OF CONFORMITY $$\text{CONFORMITY } P = \sum w(y,t) \cdot \underbrace{f(y,t)}_{\text{POSITION SIMILARITY}} + \underbrace{(1-w(y,t))g(y,t)}_{\text{SHAPE SIMILARITY}}$$

$f(y,t)$ : POSITION SIMILARITY AT PLOT POINT (y, t)
$g(y,t)$ : SHAPE SIMILARITY AT PLOT POINT (y, t)
$w(y,t)$ : AGGREGATE SIGNIFICANCE LEVEL AT PLOT POINT (y, t)

INFERENCE APPARATUS AND LEARNING APPARATUS

CROSS REFERENCE TO RELATED APPLICATIONS

This application is a Continuation of PCT International Application No. PCT/JP2021/015344 filed on Apr. 13, 2021, which is hereby expressly incorporated by reference into the present application.

TECHNICAL FIELD

The present disclosure relates to analysis of a movement path curve. The movement path curve is a curve representing a movement path of an object.

BACKGROUND ART

There is an image analysis technique that captures an image of movement of an object with an image capturing device and recognizes the type of the movement of the object through analysis of the captured image.

Such an image analysis technique analyzes captured images and extracts a movement path curve representing the movement path of the object. Then, the extracted movement path curve is compared to each of multiple learned movement path curves which are prepared in advance. Each of the learned movement path curves has a label set for it. The label indicates the type of movement. As a result of comparison, a learned movement path curve that is most similar to the extracted movement path curve is selected. Then, according to the label of the selected learned movement path curve, the type of movement of the object is recognized.

Patent Literature 1 discloses a technique as an application of such an image analysis technique, particularly a technique to recognize an action of a factory operator from a movement path curve at each body part of the operator.

CITATION LIST

Patent Literature

Patent Literature 1: Japanese application 2020-528365

SUMMARY OF INVENTION

Technical Problem

Patent Literature 1 discloses a movement type recognition technique that is robust against difference in position by comparing shapes of movement curves, in order to solve the problem that incorrect recognition arises when coordinate values of movement curves are different even if the types of movement are the same and the shapes of curves are also the same.

However, due to comparison of the shapes of movement path curves, it has a problem of being unable to correctly recognize the movement type when there are two or more learned movement path curves that are similar to each other in shape.

A primary object of the present disclosure is to solve such a problem. More specifically, the present disclosure is primarily aimed at obtaining a configuration that is capable of correctly recognizing movement type even when there are two or more learned movement path curves that are similar to each other in shape, while having performance that is robust against difference in position.

Solution to Problem

An inference apparatus according to the present disclosure, includes:
  a shape similarity computation unit to compute, as a shape similarity, a similarity in shape between a learning movement path curve which is a movement path curve obtained through learning and an observation movement path curve which is a movement path curve obtained through observation;
  a position similarity computation unit to compute, as a position similarity, a similarity in position between the learning movement path curve and the observation movement path curve when the learning movement path curve and the observation movement path curve are placed in a same coordinate space; and
  a conformity computation unit to compute a conformity between the learning movement path curve and the observation movement path curve, using the shape similarity and the position similarity.

Advantageous Effects of Invention

According to the present disclosure, movement type can be correctly recognized even when there are two or more learned movement path curves that are similar to each other in shape.

BRIEF DESCRIPTION OF DRAWINGS

FIG. 14 shows a computation example of conformity according to Embodiment 1.

DESCRIPTION OF EMBODIMENTS

Figure 1:
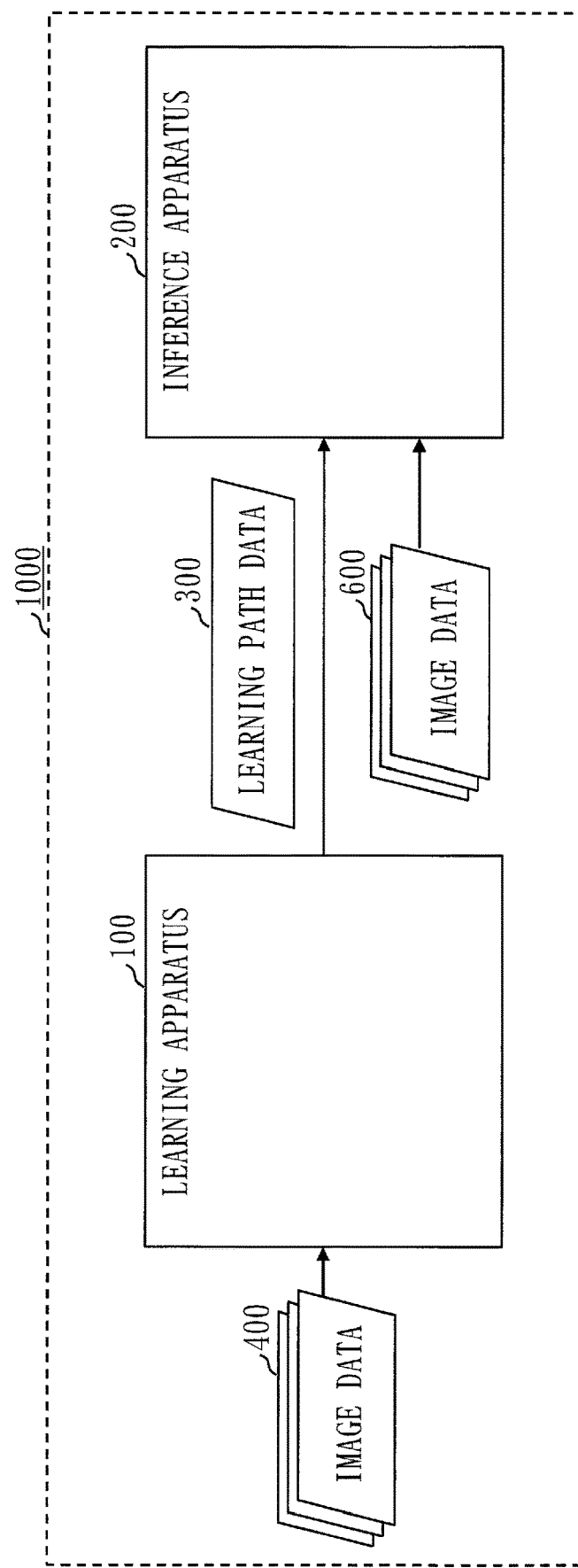
FIG. 1 shows a configuration example of an analysis system according to Embodiment 1.

Embodiments are now described with the drawings. In the following description of embodiments and drawings, items denoted with the same reference characters indicate the same or corresponding portions.

Embodiment 1

*Description of Challenge*

This embodiment describes a configuration that can correctly recognize movement type even when there are two or more learned movement path curves that are similar to each other in shape.

First, a case is discussed where the movement type cannot be correctly recognized with the conventional image analysis technique when there are two or more learned movement path curves that are similar to each other in shape.

Figure 18:
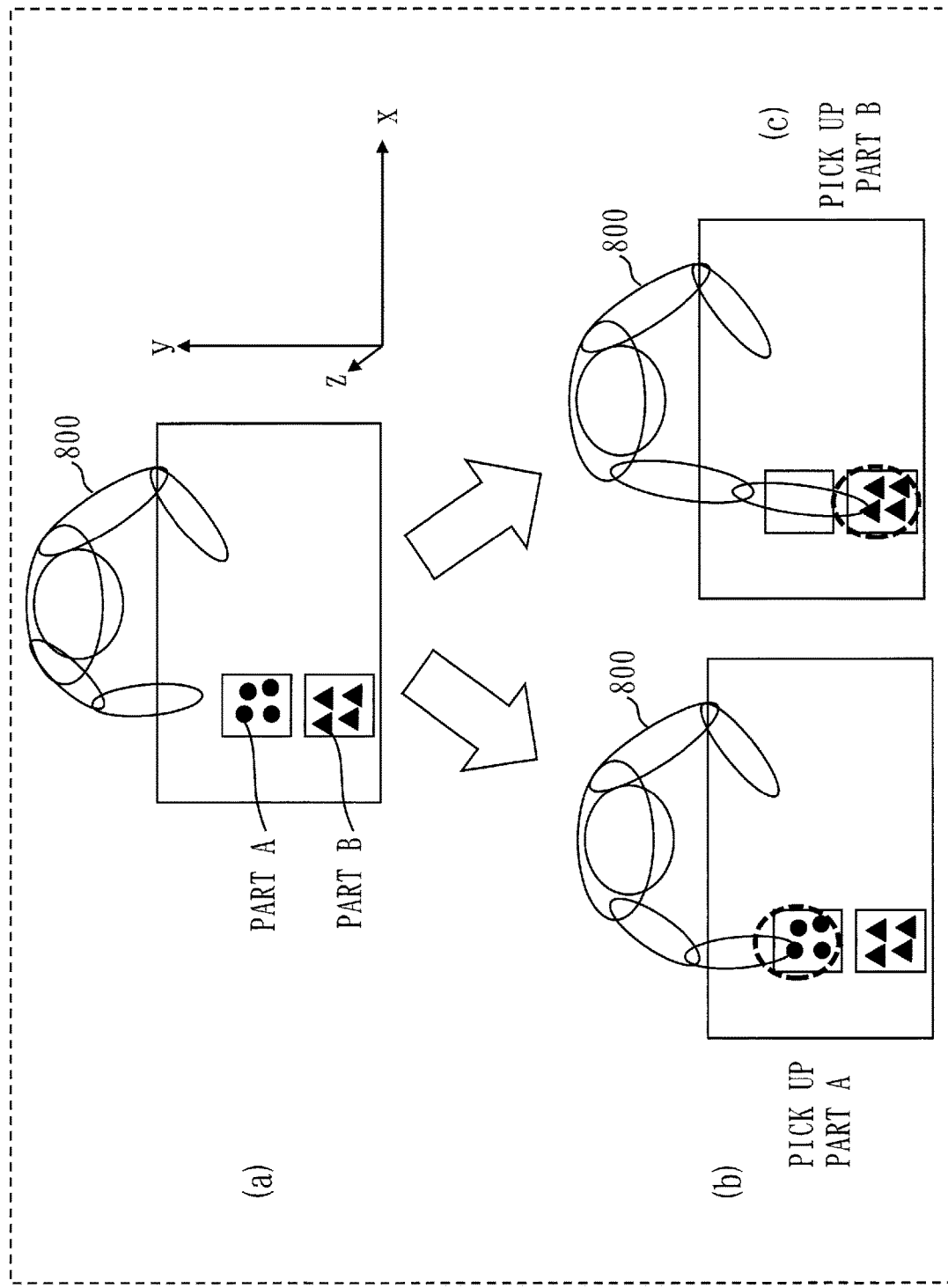
FIG. 18 shows an example of actions according to Embodiment 1.

Here, the description is made by taking an action of an operator 800 picking up a part from parts A or parts B placed in two neighboring boxes, as shown in FIG. 18, as an example.

In the example of FIG. 18, the operator 800's hand is equivalent to a moving object.

(a) of FIG. 18 illustrates a situation from when the operator 800 started reaching his/her hand out to when he/she is reaching his/her hand out. (b) of FIG. 18 illustrates a situation where the operator 800 is picking up a part A. (c) of FIG. 18 illustrates a situation where the operator 800 is picking up a part B.

In the stage of (a) of FIG. 18, there is usually little difference in the way the operator 800 reaches his/her hand out whether he/she reaches for a part A or a part B.

Figure 19:
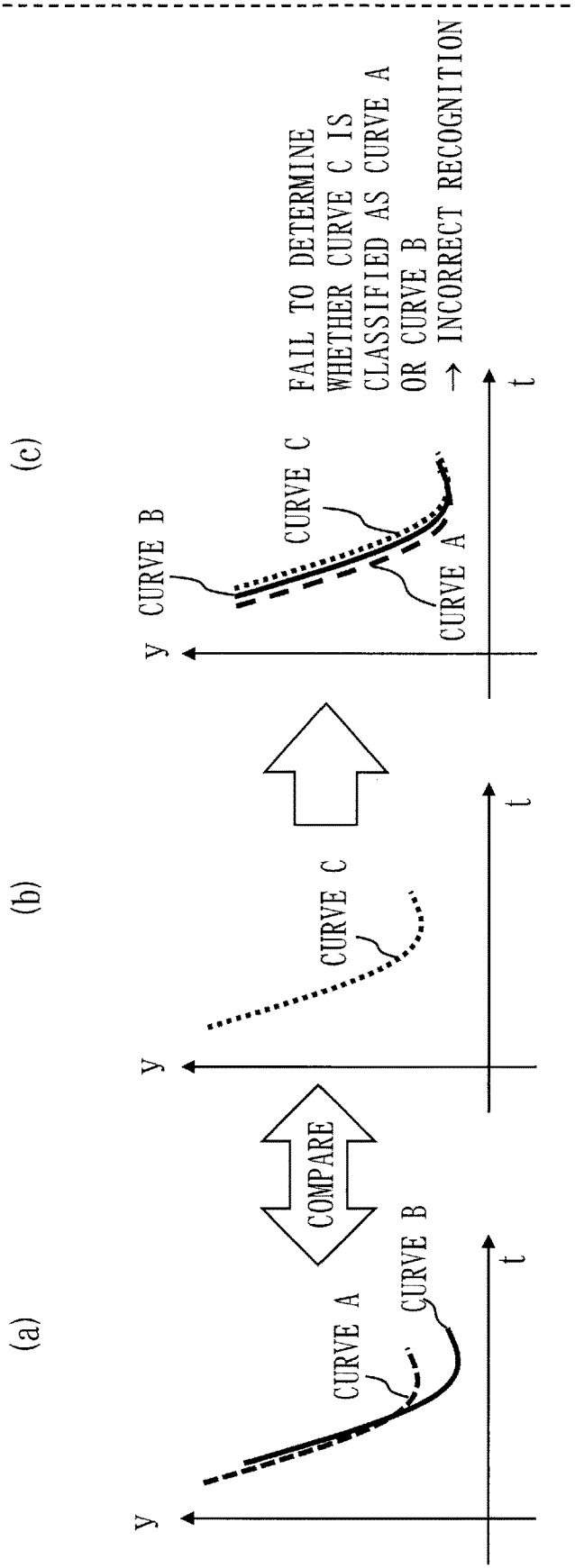
FIG. 19 shows an example of movement path curves according to Embodiment 1.

FIG. 19 shows a movement path curve representing a movement path of the hand of the operator 800 shown in FIG. 18.

(a) of FIG. 19 shows two movement path curves obtained through learning. For the two movement path curves in (a) of FIG. 19, labels have been set as learned movement path curves. Curve A is a movement path curve representing the movement path of the hand of the operator 800 when the operator 800 picked up a part A. Accordingly, for the curve A, a label like "part A acquiring action" has been set, for example. On the other hand, curve B is a movement path curve representing the movement path of the hand of the operator 800 when the operator 800 picked up a part B. Accordingly, for the curve B, a label like "part B acquiring action" has been set, for example.

Note that FIG. 19 shows movement path curves in a y-t two-dimensional coordinate space for the convenience of explanation. In practice, however, movement path curves will be established in an x-y-t coordinate space or an x-y-z-t coordinate space.

While drawings other than FIG. 19 also show examples where movement path curves are placed in a y-t two-dimensional coordinate space, it is assumed that movement path curves are actually established in an x-y-t coordinate space or an x-y-z-t coordinate space.

The x, y, and z above represent the x-, y-, and z-axes in FIG. 18, respectively. Further, t represents time.

(b) of FIG. 19 shows a movement path curve obtained through observation. That is, the curve C in (b) of FIG. 19 is a movement path curve obtained by analysis of image data acquired when the operator 800 performed an action of picking up a part A or a part B anew.

(c) of FIG. 19 shows an example of a comparison process.

In the conventional image analysis technique, the comparison process is performed only with the shapes of movement path curves. Since the curve A and the curve B are similar in shape, it is then difficult to correctly recognize whether the curve C is classified as the curve A or as the curve B.

Thus, the action of the operator 800 represented in the curve C could be incorrectly recognized.

This embodiment describes a configuration that is capable of correctly recognizing movement type when there are two or more movement path curves to be compared and the shapes of the movement path curves are similar to each other, as in FIG. 19.

*Description of Overview*

FIG. 1 shows a configuration example of an analysis system 1000 according to this embodiment.

The analysis system 1000 according to this embodiment is formed of a learning apparatus 100 and an inference apparatus 200.

The following assumes that the learning apparatus 100 and the inference apparatus 200 are implemented by separate computers, but the learning apparatus 100 and the inference apparatus 200 may be implemented by the same computer.

The learning apparatus 100 performs learning using multiple pieces of image data 400 and generates a movement path curve for each type of movement in a learning phase. The movement path curves generated by the learning apparatus 100 are used in comparisons at the inference apparatus 200. In the following, movement path curves generated by the learning apparatus 100 will be referred to as learning movement path curves. Learning movement path curves are included in learning path data 300. Details of the learning path data 300 will be discussed later.

The inference apparatus 200 analyzes image data 600 to generate a movement path curve in an inference phase. A movement path curve generated by the inference apparatus 200 is called an observation movement path curve because it is a movement path curve generated by observing an object. The inference apparatus 200 compares a learning movement path curve with the observation movement path curve.

Before describing the details of the learning apparatus 100 and the inference apparatus 200, the operational principles of the learning apparatus 100 and the inference apparatus 200 will be explained.

In this embodiment, the inference apparatus 200 performs comparison of positions of movement path curves in the inference phase in addition to comparison of the shapes of the movement path curves.

A movement path curve is divided into multiple curve components. A curve component is a point corresponding to each time within the movement path curve, that is, a plot point, for example.

Comparison of the shapes of the movement path curves and comparison of the positions of the movement path curves are performed for each curve component. In this embodiment, it is assumed that the curve component is a plot point.

Figure 6:
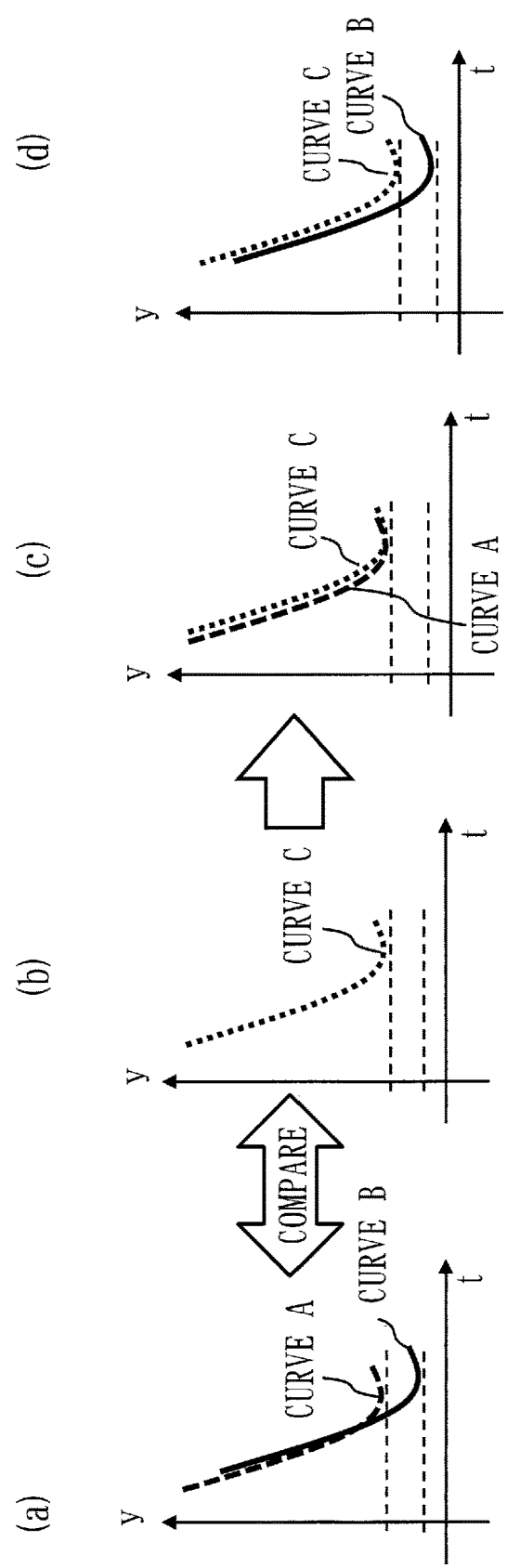
FIG. 6 shows a comparison process of the inference apparatus according to Embodiment 1.

FIG. 6 shows an example of a position comparison process by the inference apparatus 200.

(a) of FIG. 6 is the same as (a) of FIG. 19. (b) of FIG. 6 is the same as (b) of FIG. 19.

(c) of FIG. 6 shows an example of comparison of the positions of curve A and curve C by the inference apparatus 200.

In this embodiment, the inference apparatus 200 computes a similarity between the positions of the curve A and the curve C when the curve A and the curve C are placed in the same coordinate space and makes comparison of the positions of the curve A and the curve C. Specifically, the inference apparatus 200 computes the distance in y-axis direction between a plot point on the curve A and a corresponding plot point on the curve C. The inference apparatus 200 performs computation of the distance in the y-axis direction between plot points for all the pairs of plot points and aggregates the results of computation, thus computing the similarity in position between the curve A and the curve C.

Similarly, (d) of FIG. 6 is an example of comparison of the positions of curve B and curve C by the inference apparatus 200. The inference apparatus 200 compares the positions of the curve B and the curve C when the curve B and the curve C are placed in the same coordinate space and computes the similarity between them.

Comparison of shapes is shown in (c) of FIG. 19. In comparison of shapes, the similarity in shape between the movement path curves is computed.

As shown in (c) of FIG. 19, by comparison of shapes, it is difficult to determine whether the curve C is classified as the curve A or as the curve B since both the curve A and the curve B are similar to the curve C. In this embodiment, the inference apparatus 200 also performs comparison of positions. As shown in (c) and (d) of FIG. 6, the curve C is more similar to the curve A than to the curve B in position, so the inference apparatus 200 can classify the curve C as the curve A.

In this embodiment, the inference apparatus 200 performs analysis utilizing attributes of each curve component in the movement path curves in addition to comparison of the positions and shapes of the movement path curves. In accordance with such an analysis by the inference apparatus 200, the learning apparatus 100 in this embodiment performs analysis utilizing the attributes of each curve component in the movement path curves in the learning phase.

Specifically, the learning apparatus 100 and the inference apparatus 200 perform analysis utilizing movement speed for each curve component and distribution of basic movement path curves for each curve component as the attributes of each curve component. Here, a basic movement path curve is one of movement path curves indicating a series of actions generated from multiple pieces of image data 400 which are inputs to the learning phase.

In the following, analysis that utilizes the movement speed for each curve component and analysis that utilizes the distribution of basic movement path curves for each curve component will be described.

Analysis that utilizes the movement speed for each curve component is described first.

When an object moves, it is common that its movement speed varies between the start of movement and the end of movement.

This will be described taking the action of the operator 800 picking up a part A or a part B shown in FIG. 18 as an example.

In the stage of (a) of FIG. 18, the operator 800 reaches his/her hand out approximately aiming in the direction of the box of parts A and the box of parts B. Accordingly, in the stage of (a) of FIG. 18, the movement speed of the hand of the operator 800 is generally high. In contrast, in the stage of (b) or (c) of FIG. 18, the operator 800 needs to align his/her hand at the position of the box of parts A or the box of parts B. Accordingly, in the stage of (b) or (c) of FIG. 18, the movement speed of the hand of the operator 800 is generally low.

Figure 7:
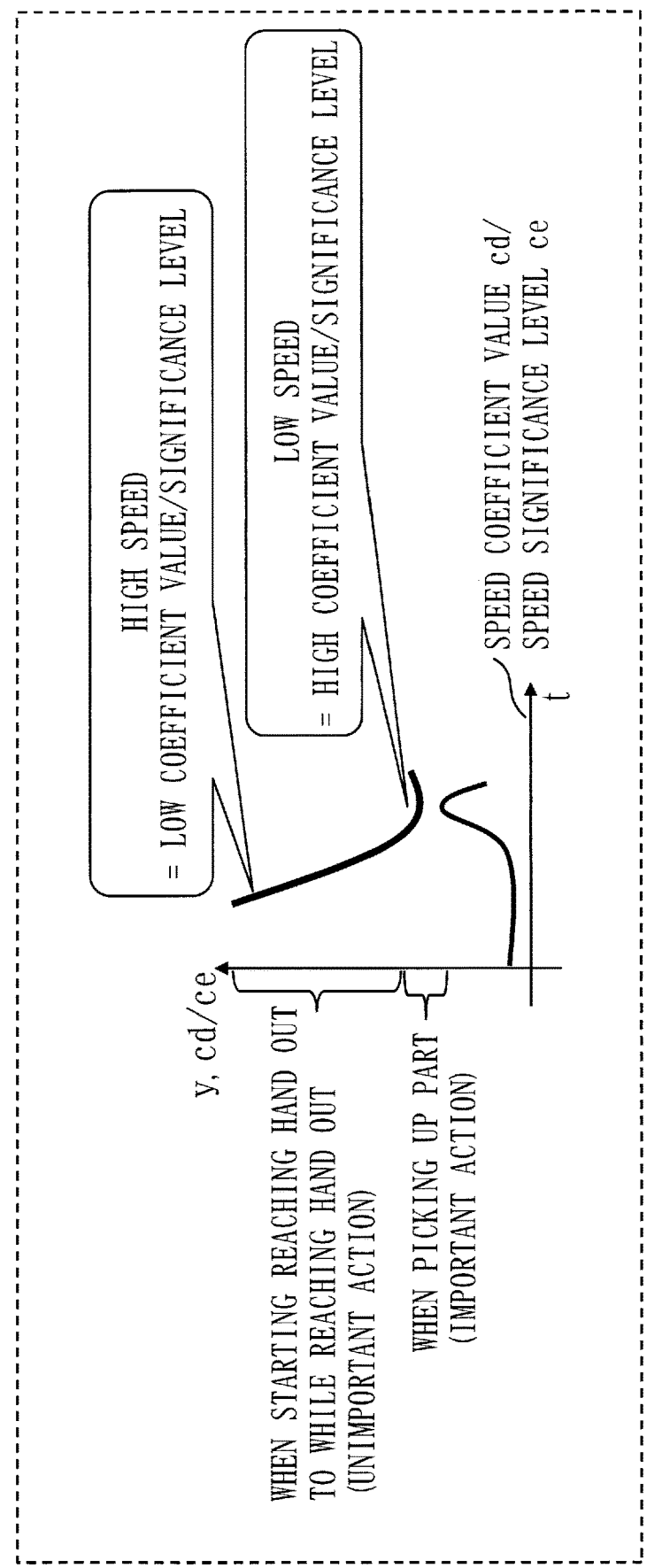
FIG. 7 shows a relation between a movement path curve and movement speed according to Embodiment 1.

FIG. 7 shows a relation between a movement path curve and the movement speed of the hand of the operator 800 in the case of performing the action of FIG. 18.

In a curve component (plot point) corresponding to the stage when the operator 800 starts reaching his/her hand out to when he/she is reaching out, the movement speed of the hand is high because an unimportant action is being performed. In contrast, in a curve component (plot point) corresponding to the stage when the operator 800 picks up a part, the movement speed of the hand becomes low because an important action of adjusting the position of the hand at the position of the part is being performed.

In this embodiment, the learning apparatus 100 and the inference apparatus 200 assesses that a curve component with a low movement speed is an important curve component, on the assumption that an important action is being performed in a curve component with a low movement speed. Specifically, the learning apparatus 100 sets a higher speed coefficient value cd for a curve component with a lower movement speed. The inference apparatus 200 also sets a higher speed significance level ce for a curve component with a lower movement speed. The inference apparatus 200 connects speed significance levels ce for the respective curve components to generate a speed significance curve.

Details of the speed coefficient value cd and the speed significance level ce will be discussed later.

Next, analysis utilizing the distribution of basic movement path curves for each curve component is described.

Figure 8:
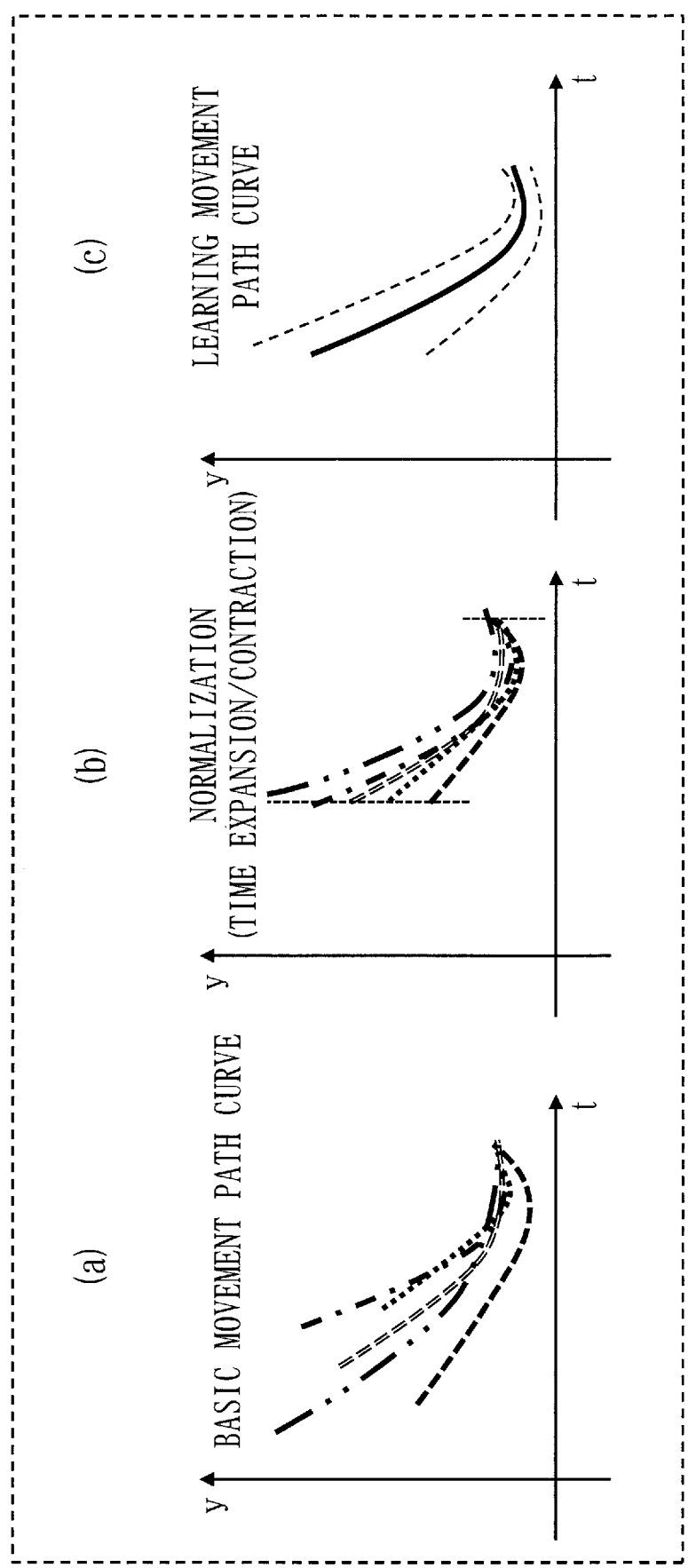
FIG. 8 shows a generation procedure of a learning movement path curve according to Embodiment 1.

In this embodiment, the learning apparatus 100 learns multiple pieces of image data 400 in which actions of the same type are captured a number of times, and generates multiple basic movement path curves as shown in (a) of FIG. 8. For example, the action of the operator 800 picking up a part A in FIG. 18 is performed multiple times. The learning apparatus 100 learns multiple pieces of image data 400 acquired by capturing the individual executions of the action of picking up a part A. Then, the learning apparatus 100 generates multiple basic movement path curves corresponding to the multiple pieces of image data 400. The learning apparatus 100 further aggregates the multiple basic movement path curves to generate a final learning movement path curve, as shown in (b) and (c) of FIG. 8.

Details of the procedure shown in FIG. 8 will be discussed later.

Figure 9:
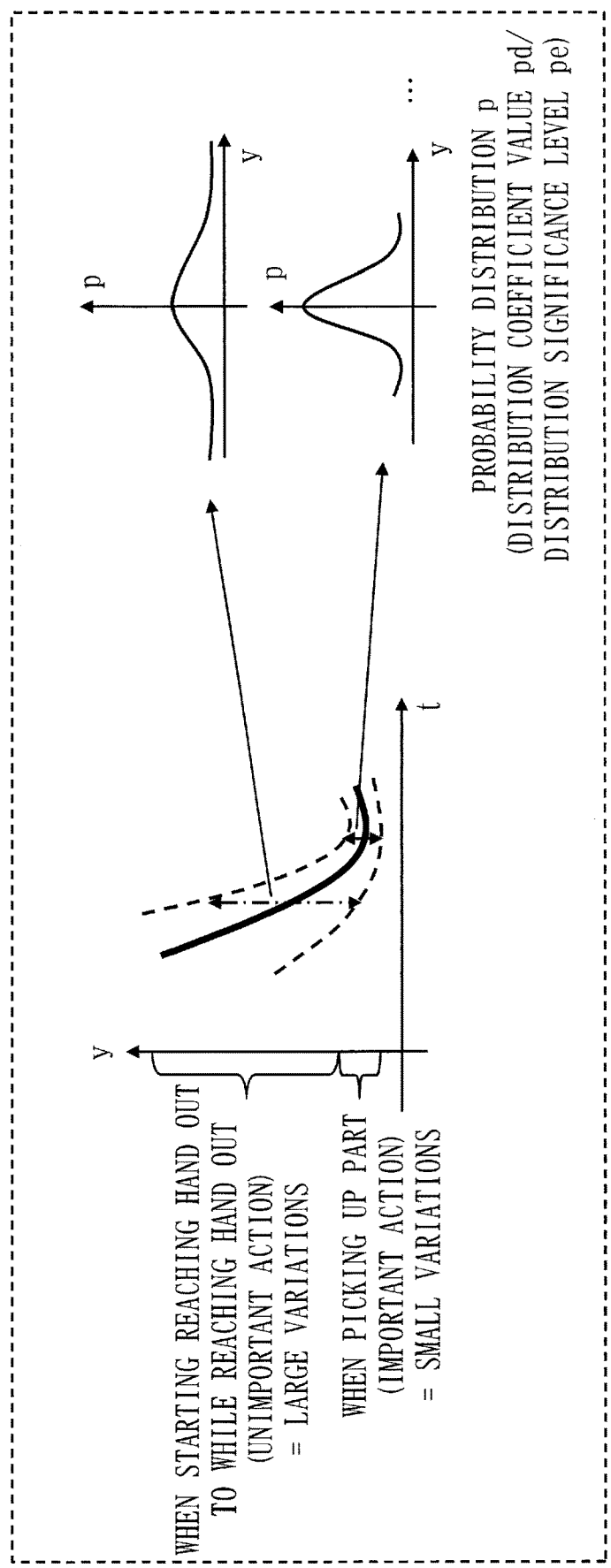
FIG. 9 shows an example of variations in basic movement path curves according to Embodiment 1.

As mentioned above, in a curve component corresponding to the stage when the operator 800 starts reaching his/her hand out to when he/she is reaching his/her hand out, an unimportant action is being performed. That is, the operator 800 is reaching his/her hand out without much attention when the operator 800 starts reaching his/her hand out to when he/she is reaching his/her hand out, so that there are large variations in the distribution of multiple basic movement path curves as shown in FIG. 9. On the other hand, in a curve component corresponding to the stage when the operator 800 picks up a part, an important action of adjusting the position of the hand at the position of the part is conducted. Accordingly, in the stage where the operator 800 picks up a part, variations in the distribution of multiple basic movement path curves are small as shown in FIG. 9.

Taking this into account, the learning apparatus 100 calculates a probability distribution p of the movement path curves with the multiple basic movement path curves normalized with respect to time. Then, the learning apparatus 100 sets a distribution coefficient value pd in accordance with a likelihood calculated from the probability distribution p. The learning apparatus 100 sets a higher distribution coefficient value pd for a curve component with a higher likelihood. As shown in FIG. 9, for a curve component with large variation, the learning apparatus 100 sets a low distribution coefficient value pd because the likelihood is low. For a curve component with small variation, on the other hand, the learning apparatus 100 sets a high distribution coefficient value pd because the likelihood is high. The learning apparatus 100 connects distribution coefficient values pd for the respective curve components to generate a distribution coefficient curve.

Here, the probability distribution p can be of any shape. That is, the shape of the probability distribution p can be a normal distribution or non-parametric (not of a mathematical model). The probability distribution p may also be a single numerical value instead of having a distribution shape.

Details of the distribution coefficient value pd and the distribution significance level pe will be discussed later.

*Description of Configuration*

Based on the description above, details of the configurations of the learning apparatus 100 and the inference apparatus 200 are described.

Figure 2:
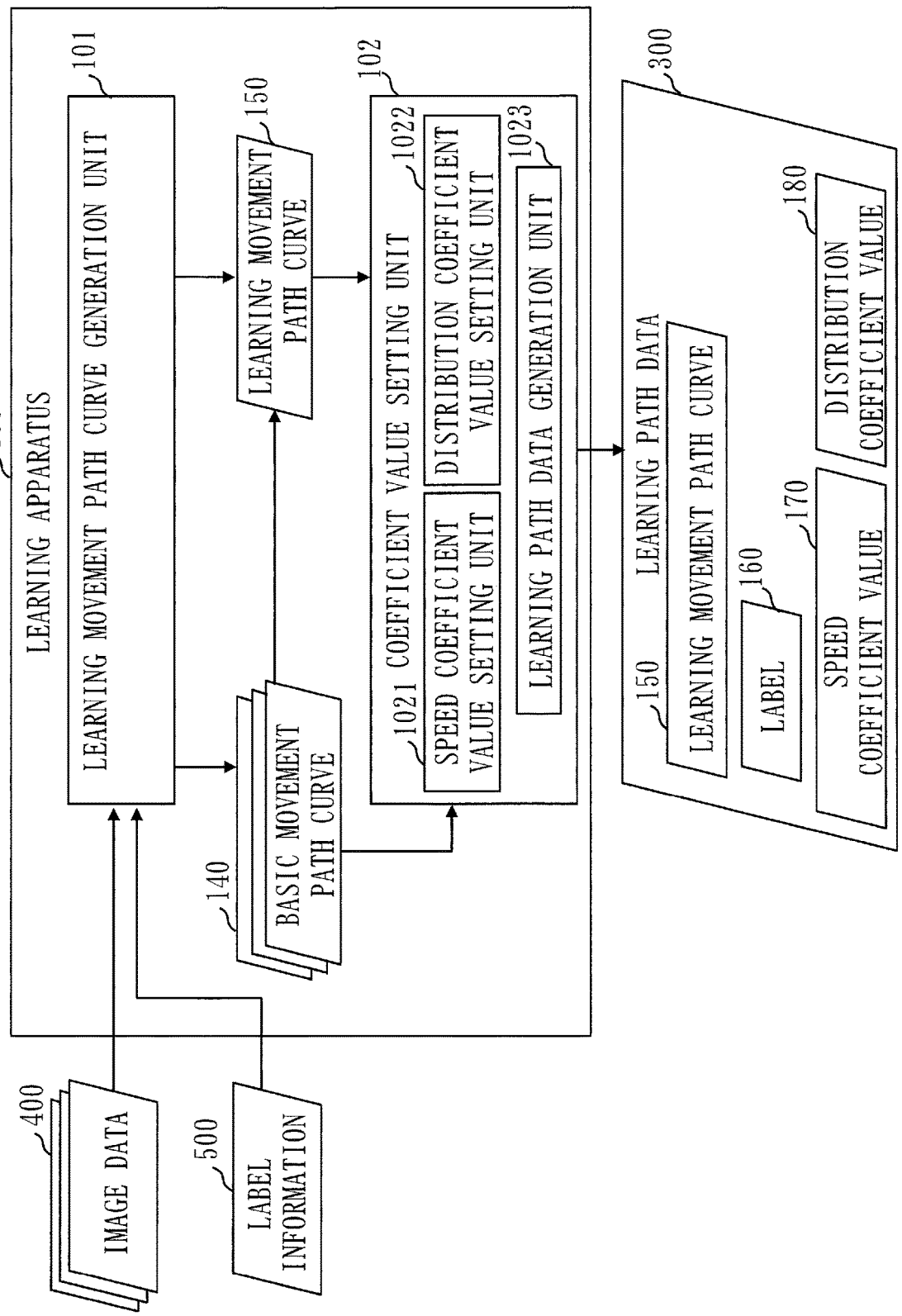
FIG. 2 shows a functional configuration example of a learning apparatus according to Embodiment 1.

FIG. 2 shows a functional configuration example of the learning apparatus 100 according to this embodiment.

Figure 3:
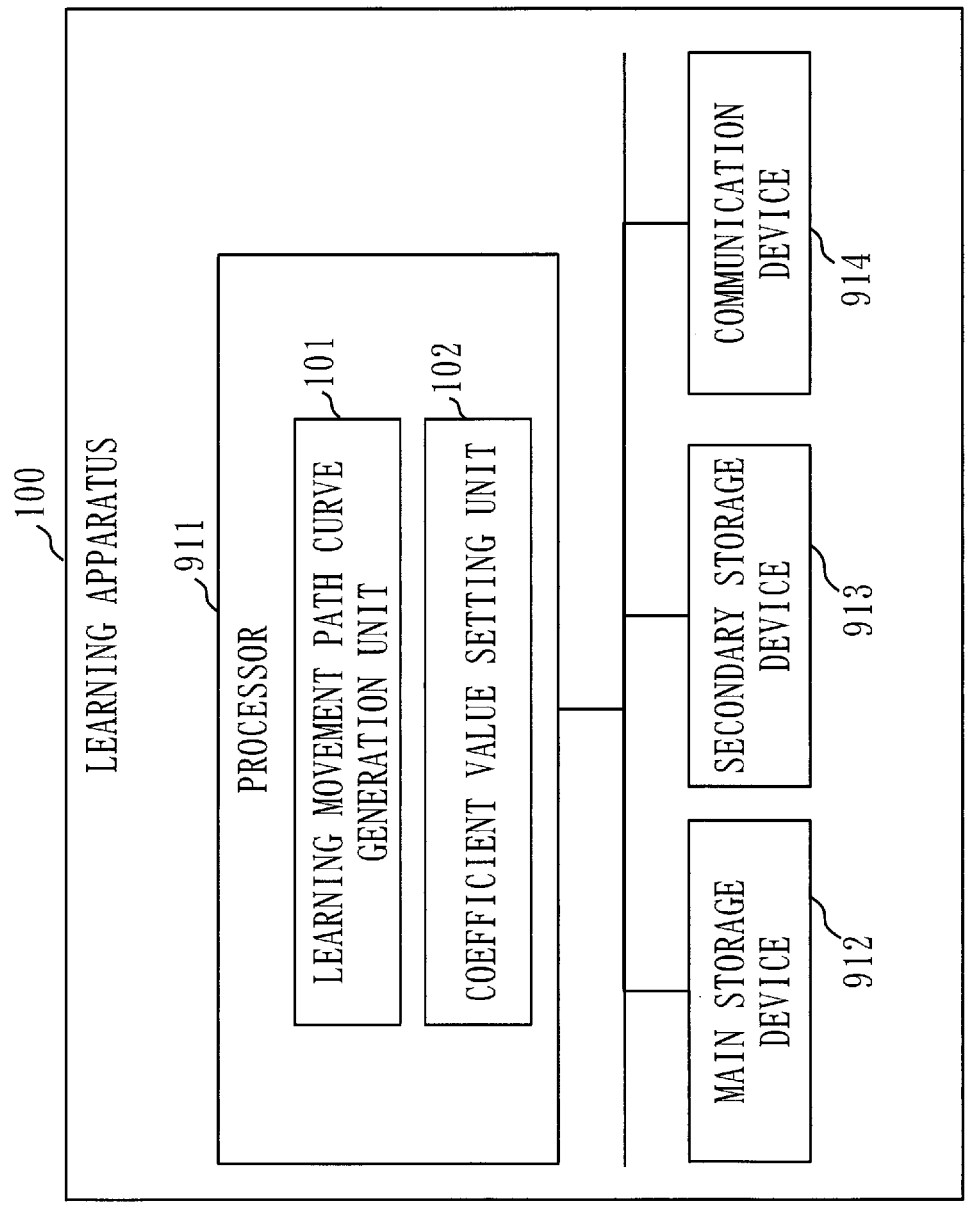
FIG. 3 shows a hardware configuration example of the learning apparatus according to Embodiment 1.

FIG. 3 shows a hardware configuration example of the learning apparatus 100.

First, referring to FIG. 3, a hardware configuration example of the learning apparatus 100 is described.

The learning apparatus 100 according to this embodiment is a computer. An operational procedure of the learning apparatus 100 corresponds to a learning method. A program for implementing the operations of the learning apparatus 100 corresponds to a learning program.

The learning apparatus 100 includes a processor 911, a main storage device 912, a secondary storage device 913, and a communication device 914 as hardware components.

The learning apparatus 100 also includes a learning movement path curve generation unit 101 and a coefficient value setting unit 102 as functional components, as shown in FIG. 2.

The secondary storage device 913 stores programs for implementing the functions of the learning movement path curve generation unit 101 and the coefficient value setting unit 102.

These programs are loaded from the secondary storage device 913 to the main storage device 912. Then, the processor 911 executes the programs to perform the operations of the learning movement path curve generation unit 101 and the coefficient value setting unit 102, to be discussed later.

FIG. 3 schematically illustrates a situation where the processor 911 is executing the programs for implementing the functions of the learning movement path curve generation unit 101 and the coefficient value setting unit 102.

Next, referring to FIG. 2, a functional configuration example of the learning apparatus 100 is described.

The learning movement path curve generation unit 101 generates a learning movement path curve 150 by learning. More specifically, the learning movement path curve generation unit 101 retrieves multiple pieces of image data 400, performs image analysis, and generates multiple basic movement path curves 140 based on the results of image analysis. Then, the learning movement path curve generation unit 101 aggregates the generated multiple basic movement path curves 140 to generate a learning movement path curve 150, as described with FIG. 8.

The image data 400 is image data that captures the action of the operator 800 picking up a part A shown in FIG. 18, for example. The image data 400 is also image data that captures the action of the operator 800 picking up a part B shown in FIG. 18, for example.

The learning movement path curve 150 is a movement path curve in which the movement path of movement of an object is represented. The learning movement path curve 150 is divided into multiple curve components (plot points).

The learning movement path curve generation unit 101 also obtains label information 500 from a user of the learning apparatus 100, for example. The label information 500 is a label classifying the basic movement path curve 140 and the learning movement path curve 150. For example, if the image data 400 is multiple pieces of image data capturing the series of actions of the operator 800 picking up a part A shown in FIG. 18, the label information 500 will be a label indicating "part A acquiring action". Likewise, if the image data 400 is multiple pieces of image data capturing the actions of the operator 800 picking up a part B shown in FIG. 18, the label information 500 will be a label indicating "part B acquiring action".

Processing performed by the learning movement path curve generation unit 101 corresponds to a learning movement path curve generation process.

The coefficient value setting unit 102 sets a coefficient value for each curve component (plot point) of the learning movement path curve 150 based on attributes.

The coefficient value setting unit 102 consists of a speed coefficient value setting unit 1021, a distribution coefficient value setting unit 1022, and a learning path data generation unit 1023.

Processing performed by the coefficient value setting unit 102 corresponds to a coefficient value setting process.

The speed coefficient value setting unit 1021 sets a coefficient value for each curve component based on the movement speed of the object for each curve component, which is an attribute of each curve component of the learning movement path curve 150. The coefficient value set by the speed coefficient value setting unit 1021 is the speed coefficient value cd.

The speed coefficient value setting unit 1021 sets a higher speed coefficient value cd for a curve component with a lower movement speed of the object.

The distribution coefficient value setting unit 1022 sets a coefficient value for each curve component based on the probability distribution p of multiple basic movement path curves 140 for each curve component that would arise when the learning movement path curve 150 and the multiple basic movement path curves 140 are superimposed in the same coordinate space, which is an attribute of each curve component of the learning movement path curve 150. The coefficient value set by the distribution coefficient value setting unit 1022 is the distribution coefficient value pd.

The distribution coefficient value setting unit 1022 sets a higher distribution coefficient value pd for a curve component at which a likelihood that is calculated from the probability distribution p of multiple basic movement path curves 140 is higher. The learning path data generation unit 1023 generates learning path data 300.

Specifically, the learning path data generation unit 1023 generates learning path data 300 including the learning movement path curve 150, a label 160 indicated in the label information 500, a speed coefficient value 170 (speed coefficient value cd), and a distribution coefficient value 180 (distribution coefficient value pd).

The learning path data generation unit 1023 generates the learning path data 300 for each movement type. Specifically, the learning path data generation unit 1023 generates learning path data 300 for the "part A acquiring action" and learning path data 300 for the "part B acquiring action", for example.

Each learning path data 300 is transmitted to the inference apparatus 200 by the communication device 914, for example.

Figure 4:
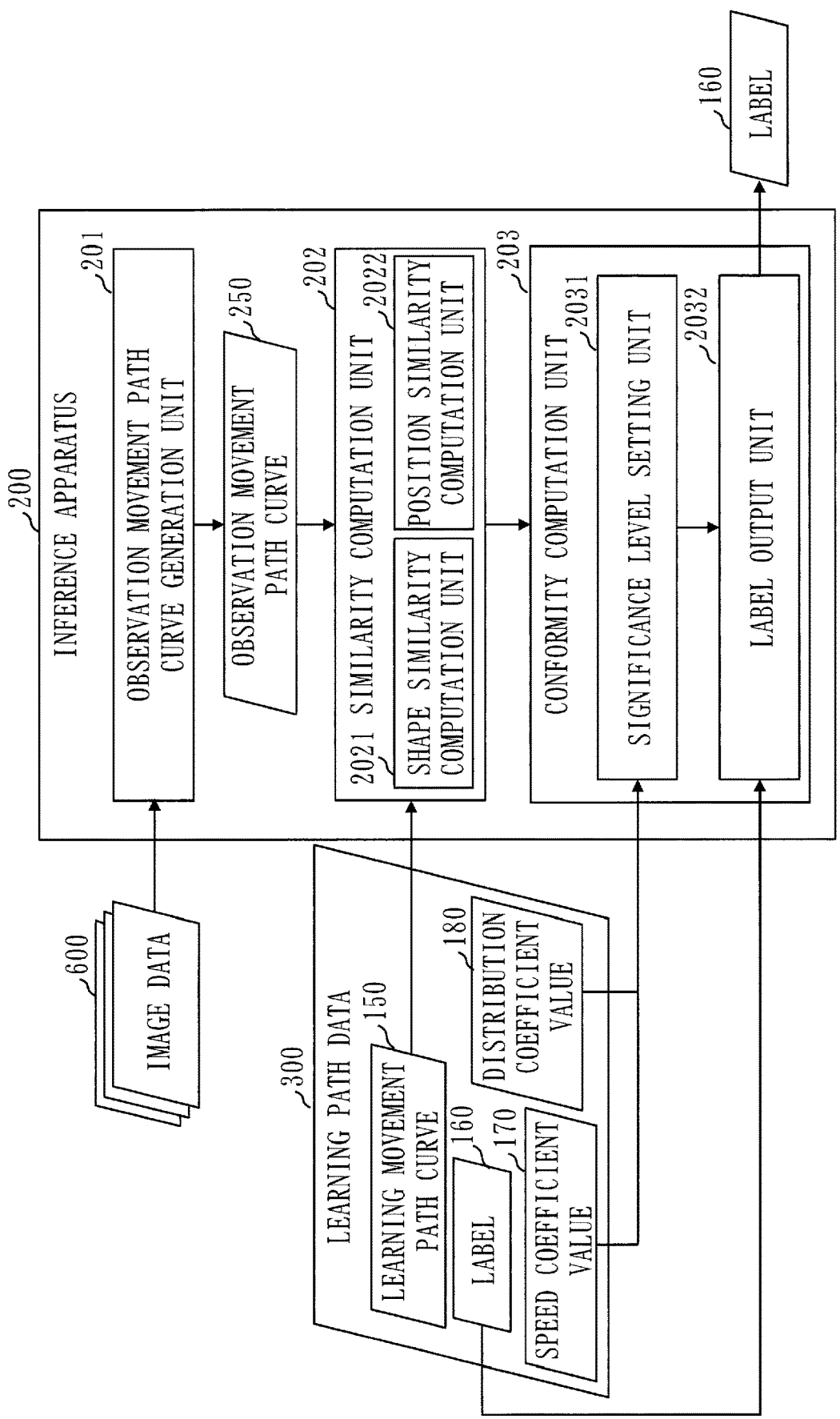
FIG. 4 shows a functional configuration example of an inference apparatus according to Embodiment 1.

FIG. 4 shows a functional configuration example of the inference apparatus 200 according to this embodiment.

Figure 5:
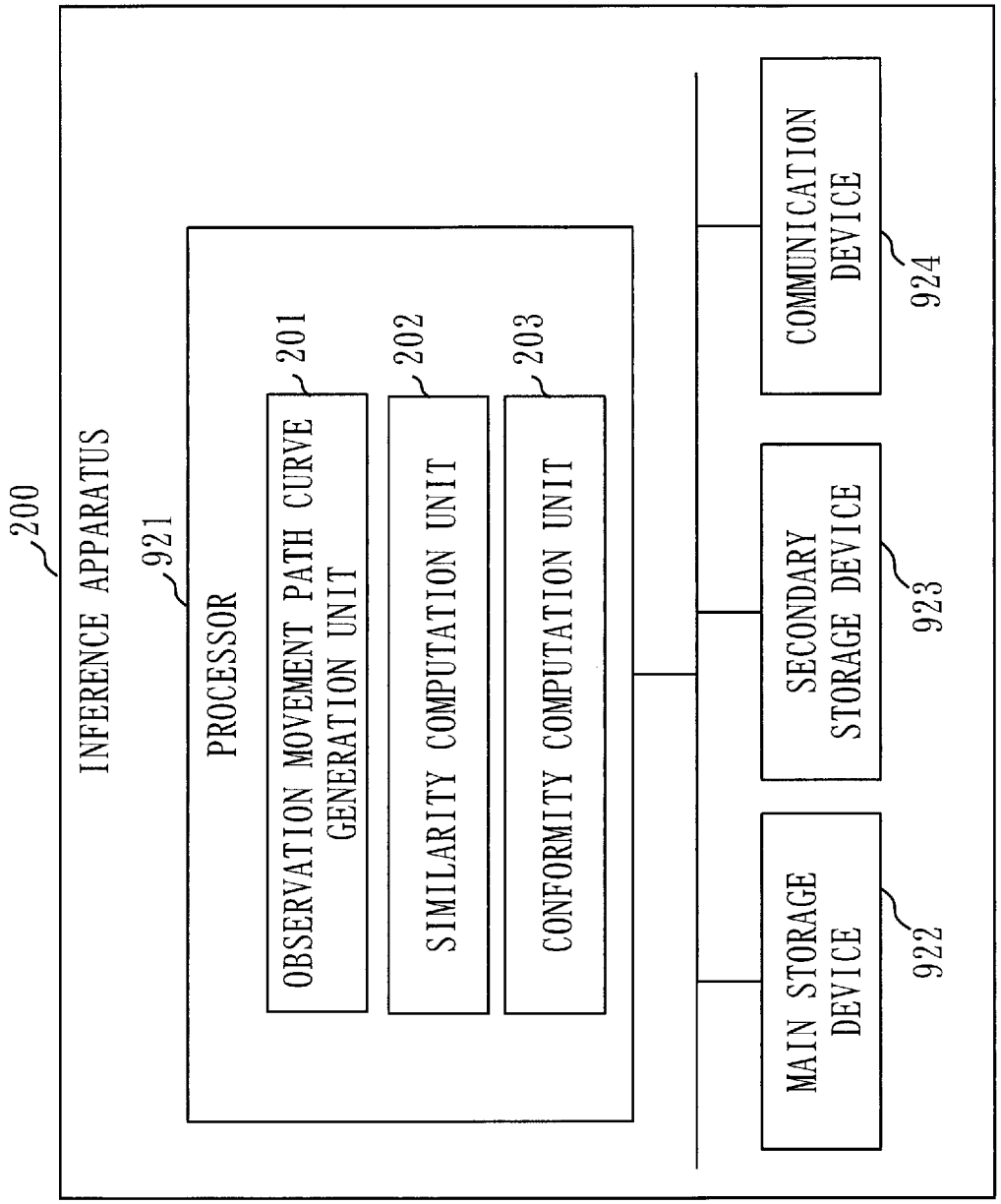
FIG. 5 shows a hardware configuration example of the inference apparatus according to Embodiment 1.

FIG. 5 shows a hardware configuration example of the inference apparatus 200.

First, referring to FIG. 5, a hardware configuration example of the inference apparatus 200 is described.

The inference apparatus 200 according to this embodiment is a computer. An operational procedure of the inference apparatus 200 corresponds to an inference method. A program for implementing the operations of the inference apparatus 200 corresponds to an inference program.

The inference apparatus 200 includes a processor 921, a main storage device 922, a secondary storage device 923, and a communication device 924 as hardware components.

The inference apparatus 200 also includes an observation movement path curve generation unit 201, a similarity computation unit 202, and a conformity computation unit 203 as functional components, as shown in FIG. 4.

The secondary storage device 923 stores programs for implementing the functions of the observation movement path curve generation unit 201, the similarity computation unit 202, and the conformity computation unit 203.

These programs are loaded from the secondary storage device 923 to the main storage device 922. Then, the processor 921 executes the programs to perform the operations of the observation movement path curve generation unit 201, the similarity computation unit 202, and the conformity computation unit 203, to be discussed later.

FIG. 5 schematically illustrates a situation where the processor 921 is executing the programs for implementing the functions of the observation movement path curve generation unit 201, the similarity computation unit 202, and the conformity computation unit 203.

Next, referring to FIG. 4, a functional configuration example of the inference apparatus 200 is described.

The observation movement path curve generation unit 201 retrieves multiple pieces of image data 600, performs image analysis on the image data 600, and generates observation movement path curve 250 based on the results of image analysis.

The multiple pieces of image data 600 is a series of image data capturing the action of the operator 800 picking up a part A shown in FIG. 18, for example. The observation movement path curve 250 is a movement path curve in which the movement path of movement of an object is represented. The observation movement path curve 250 is divided into multiple curve components (plot points) corresponding to the multiple curve components (plot points) of the learning movement path curve 150.

The similarity computation unit 202 retrieves the learning path data 300 and the observation movement path curve 250.

The similarity computation unit 202 then computes the similarity between the learning movement path curve 150 and the observation movement path curve 250.

If the learning apparatus 100 has generated learning path data 300 for the "part A acquiring action" and learning path data 300 for the "part B acquiring action", the similarity computation unit 202 retrieves the learning path data 300 for the "part A acquiring action" and the learning path data 300 for the "part B acquiring action".

Then, the similarity computation unit 202 computes the similarity between the learning movement path curve 150 and the observation movement path curve 250 for the "part A acquiring action". Likewise, the similarity computation unit 202 computes the similarity between the learning movement path curve 150 and the observation movement path curve 250 for the "part B acquiring action".

The similarity computation unit 202 consists of a shape similarity computation unit 2021 and a position similarity computation unit 2022.

The shape similarity computation unit 2021 computes a shape similarity between the learning movement path curve 150 and the observation movement path curve 250.

The shape similarity computation unit 2021 computes a shape similarity for each pair of corresponding curve components between the learning movement path curve 150 and the observation movement path curve 250.

Processing performed by the shape similarity computation unit 2021 corresponds to a shape similarity computation process.

The position similarity computation unit 2022 computes a position similarity between the learning movement path curve 150 and the observation movement path curve 250. Position similarity is the similarity in position between the learning movement path curve 150 and the observation movement path curve 250 when the learning movement path curve 150 and the observation movement path curve 250 are placed in the same coordinate space.

The position similarity computation unit 2022 computes the position similarity for each pair of corresponding curve components between the learning movement path curve 150 and the observation movement path curve 250.

Processing performed by the position similarity computation unit 2022 corresponds to a position similarity computation process.

Figure 10:
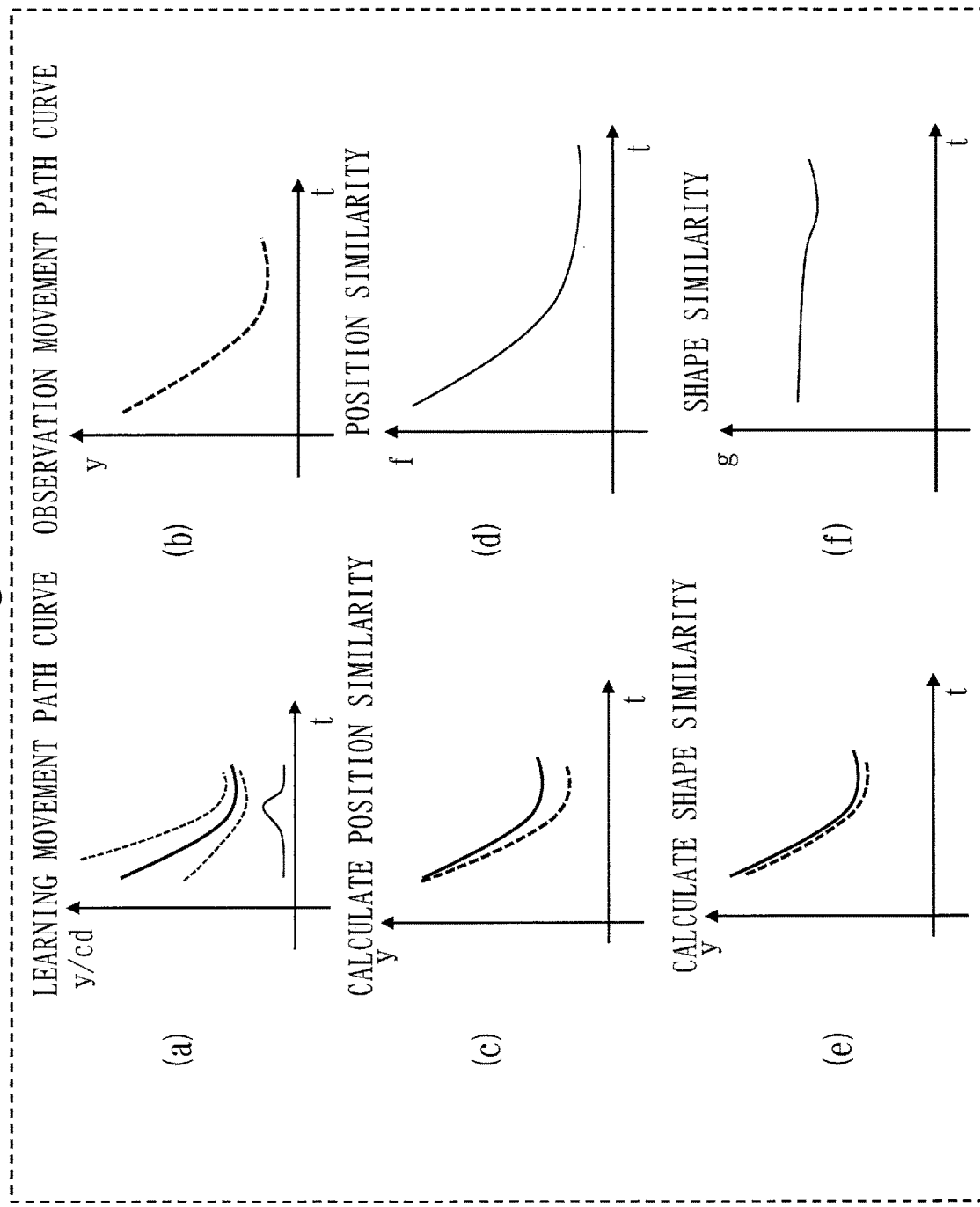
FIG. 10 shows an example of position similarity and shape similarity according to Embodiment 1.

FIG. 10 shows an example of position similarity and shape similarity.

(a) of FIG. 10 shows an example of the learning movement path curve 150.

(b) of FIG. 10 shows an example of the observation movement path curve 250.

(c) of FIG. 10 shows a calculation concept of position similarity. (d) of FIG. 10 shows a concept of position similarity determined from the calculation in (c) of FIG. 10. In (d) of FIG. 10, "f" represents the position similarity.

(e) of FIG. 10 shows a calculation concept of shape similarity. (f) of FIG. 10 shows a concept of shape similarity determined from the calculation in (e) of FIG. 10. In (f) of FIG. 10, "g" represents the shape similarity.

The conformity computation unit 203 computes a conformity between the learning movement path curve 150 and the observation movement path curve 250, using the shape similarity and the position similarity computed by the similarity computation unit 202.

If the learning apparatus 100 has generated learning path data 300 for the "part A acquiring action" and learning path data 300 for the "part B acquiring action", the conformity computation unit 203 computes the conformity between the learning movement path curve 150 and the observation movement path curve 250 for the "part A acquiring action". Likewise, the conformity computation unit 203 computes the conformity between the learning movement path curve 150 and the observation movement path curve 250 for the "part B acquiring action".

The conformity computation unit 203 then outputs the label 160 of a movement type with high conformity.

Processing performed by the conformity computation unit 203 corresponds to a conformity computation process.

The conformity computation unit 203 consists of a significance level setting unit 2031 and a label output unit 2032.

The significance level setting unit 2031 sets a significance level for each curve component of the learning movement path curve 150 based on attributes of each curve component.

Specifically, the significance level setting unit 2031 computes a speed significance level and a distribution significance level from the speed coefficient value 170 and the distribution coefficient value 180, respectively, in the learning path data 300.

The label output unit 2032 aggregates the speed significance level and the distribution significance level to calculate an aggregate significance level. Then, the label output unit 2032 computes the conformity between the learning movement path curve 150 and the observation movement path curve 250, using the shape similarity, position similarity, and aggregate significance level for each curve component.

Specifically, for each curve component, the label output unit 2032 corrects at least either of the shape similarity and the position similarity with the aggregate significance level of the same curve component. Then, the label output unit 2032 computes the conformity between the learning movement path curve 150 and the observation movement path curve 250, using the non-corrected/corrected shape similarity and non-corrected/corrected position similarity for each curve component.

The label output unit 2032 then selects the learning movement path curve 150 with the highest conformity from among the multiple learning movement path curves 150, selects the learning path data 300 corresponding to the selected learning movement path curve 150, and outputs the label 160 of the selected learning path data 300.

\*\*\*Description of Operation\*\*\*

Next, exemplary operations of the learning apparatus 100 and the inference apparatus 200 according to this embodiment are shown.

Figure 11:
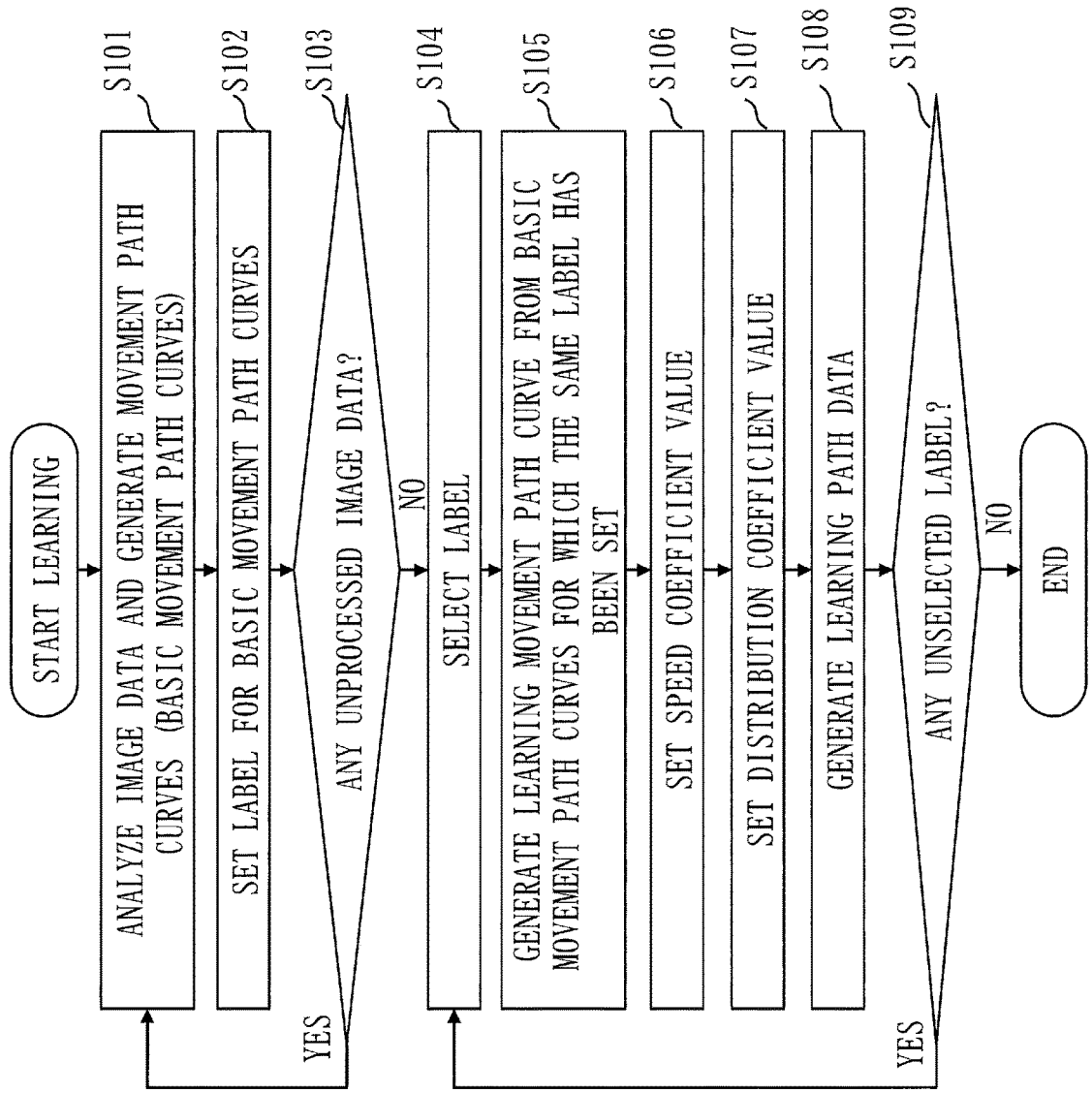
FIG. 11 is a flowchart illustrating an exemplary operation of the learning apparatus according to Embodiment 1.

FIG. 11 shows an exemplary operation of the learning apparatus 100.

Referring to FIG. 11, an exemplary operation of the learning apparatus 100 is described first.

First, in step S101, the learning movement path curve generation unit 101 analyzes image data 400 generated by capturing multiple actions of the same type and generates movement path curves from the image data 400 for each action. The movement path curves generated in step S101 is equivalent to basic movement path curves 140.

For example, the learning movement path curve generation unit 101 learns a series of multiple pieces of image data 400 for the action of the operator 800 picking up a part A in FIG. 18, and generates multiple basic movement path curves 140 corresponding to the action of the operator 800 picking up a part A.

In practice, the learning movement path curve generation unit 101 generates a movement path curve for the coordinates of each body part of the operator 800. In the present specification, for the simplicity of description, movement path curves for the operator 800's hand are exclusively described among the movement path curves generated by the learning movement path curve generation unit 101. For the movement path curves that are generated by the observation movement path curve generation unit 201 as well, movement path curves for the operator 800's hand are exclusively described.

Next, in step S102, the learning movement path curve generation unit 101 sets an appropriate label for the multiple basic movement path curves 140 generated in step S101 based on label information 500 entered by the user of the learning apparatus 100.

In the foregoing example, the learning movement path curve generation unit 101 sets the label "part A acquiring action" for the multiple basic movement path curves 140, for example.

Next, in step S103, the learning movement path curve generation unit 101 determines whether there is any unprocessed image data 400 or not.

If there is unprocessed image data 400, processing returns to step S101. On the other hand, if there is no unprocessed image data 400, processing continues to step S104.

In step S104, the learning movement path curve generation unit 101 selects any unselected label.

Next, in step S105, the learning movement path curve generation unit 101 aggregates the basic movement path curves 140 for which the same label as that selected in step S104 has been set, and generates a learning movement path curve 150.

Referring to FIG. 8, details of step S105 are described.

The learning movement path curve generation unit 101 places the multiple basic movement path curves 140 with the same label being set in the same coordinate space, as shown in (a) of FIG. 8.

Next, the learning movement path curve generation unit 101 normalizes the multiple basic movement path curves 140 with respect to time as shown in (b) of FIG. 8. Specifically, the learning movement path curve generation unit 101 performs time alignment and time expansion/contraction. That is, the learning movement path curve generation unit 101 performs time expansion/contraction on each basic movement path curve 140 so that the starting point times and end point times of the multiple basic movement path curves 140 coincide with each other. The learning movement path curve generation unit 101 may expand or contract the entire section of each basic movement path curve 140 by a certain rate. The learning movement path curve generation unit 101 may also determine an optimal expansion/contraction rate for each time, using an approach such as DTW (Dynamic Time Warping).

Next, the learning movement path curve generation unit 101 aggregates the multiple basic movement path curves 140 after normalization to generate one learning movement path curve 150 as shown in (c) of FIG. 8. For example, the learning movement path curve generation unit 101 handles an average movement path curve of the multiple basic movement path curves 140 after normalization as the learning movement path curve 150. The solid line in (c) of FIG. 8 indicates the learning movement path curve 150. In (c) of FIG. 8, the learning movement path curve 150 is a movement path curve which is an average of the basic movement path curves 140 after normalization. The broken lines in (c) of FIG. 8 indicate variations in the basic movement path curves 140 after normalization.

The learning movement path curve generation unit 101 sets the label that has been set for the multiple basic movement path curves 140 as the label 160 of the learning movement path curve 150.

Next, in step S106 of FIG. 10, the speed coefficient value setting unit 1021 sets the speed coefficient value cd of each curve component for the learning movement path curve 150.

The speed coefficient value setting unit 1021 retrieves the learning movement path curve 150 from the learning movement path curve generation unit 101, analyzes the learning movement path curve 150 to compute a speed coefficient value cd, and sets the computed speed coefficient value cd for the learning movement path curve 150.

Specifically, the speed coefficient value setting unit 1021 computes the movement speed by dividing the distance from the immediately preceding plot point by a unit time (the period of time between plot points), for each plot point on the learning movement path curve 150. Then, the speed coefficient value setting unit 1021 turns the movement speed for each plot point into a coefficient, thus obtaining the speed coefficient value cd for each plot point. Further, the speed coefficient value setting unit 1021 associates the speed coefficient value cd with each plot point.

Next, in step S107, the distribution coefficient value setting unit 1022 sets the distribution coefficient value pd of each curve component for the learning movement path curve 150.

The distribution coefficient value setting unit 1022 retrieves the learning movement path curve 150 and multiple basic movement path curves 140, and computes the probability distribution p of the basic movement path curves 140 that would arise when the learning movement path curve 150 and the multiple basic movement path curves 140 are superimposed in the same coordinate space. Then, the distribution coefficient value setting unit 1022 computes a likelihood from the probability distribution p of the basic movement path curves 140 for each plot point on the learning movement path curve 150, and turns the likelihood into a coefficient to obtain the distribution coefficient value pd. Further, the distribution coefficient value setting unit 1022 associates the distribution coefficient value pd with each plot point.

Note that step S106 and step S107 may be interchanged in order.

Next, in step S108, the learning path data generation unit 1023 generates learning path data 300.

The learning path data generation unit 1023 aggregates the learning movement path curve 150, the label 160 of the learning movement path curve 150, the speed coefficient value 170 (the speed coefficient value cd for each curve component), and the distribution coefficient value 180 (distribution coefficient value pd for each curve component) to generate learning path data 300.

The learning path data 300 generated by the learning path data generation unit 1023 may be transmitted to the inference apparatus 200 by the communication device 914 or may be output to the inference apparatus 200 in any other way. Alternatively, a portable recording medium storing the learning path data 300 may be delivered by mail or the like.

Finally, in step S109, the learning movement path curve generation unit 101 determines whether there is an unselected label or not. If there is an unselected label, processing returns to step S104. On the other hand, if there is no unselected label, processing ends.

Figure 12:
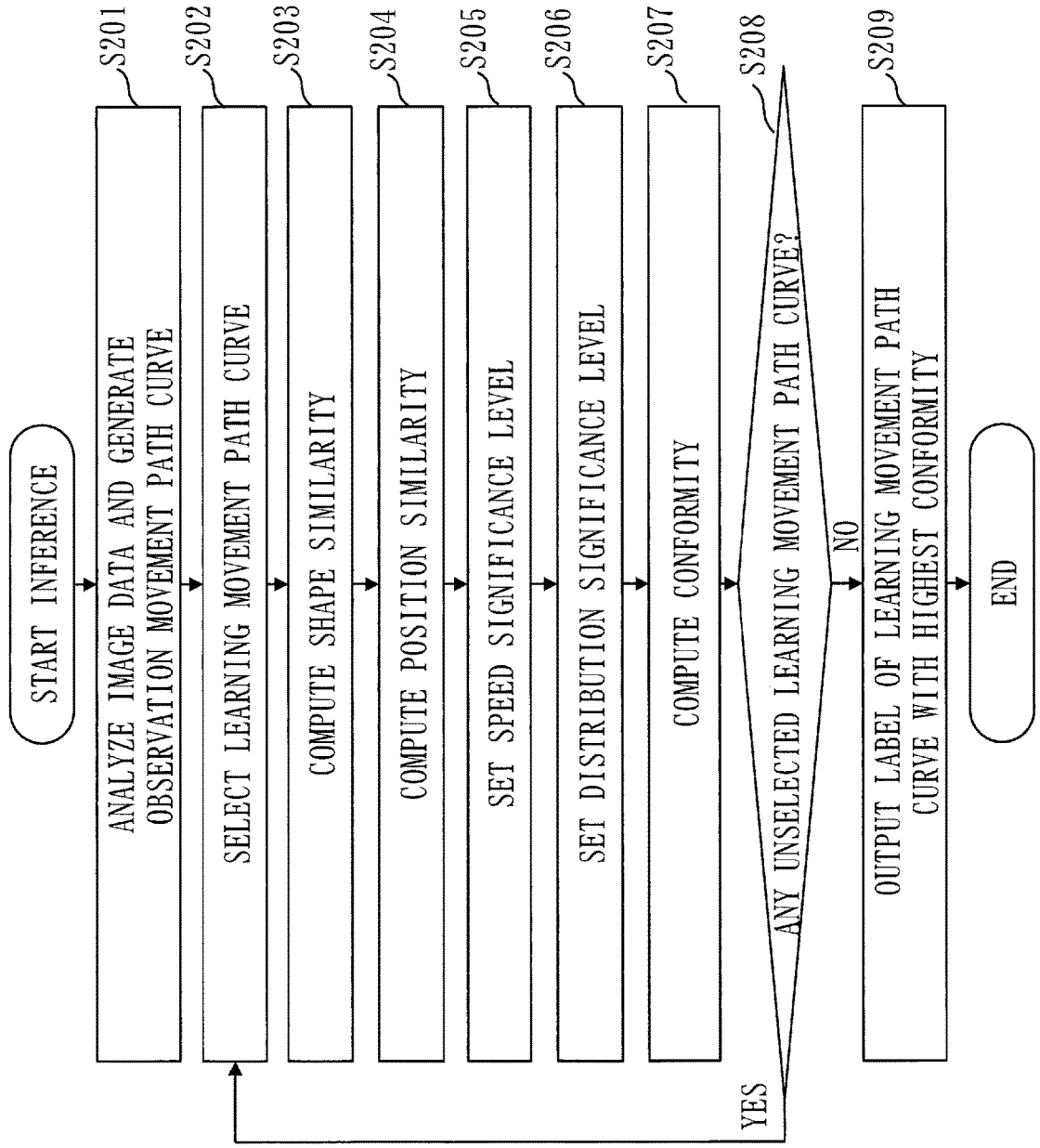
FIG. 12 is a flowchart illustrating an exemplary operation of the inference apparatus according to Embodiment 1.

Next, with reference to FIG. 12, an exemplary operation of the inference apparatus 200 is described.

First, in step S201, the observation movement path curve generation unit 201 analyzes multiple pieces of image data 600 and generates a movement path curve from the multiple pieces of image data 600. The movement path curve generated in step S201 is equivalent to the observation movement path curve 250.

For example, the observation movement path curve generation unit 201 analyzes multiple pieces of image data 600 capturing the series of actions of the operator 800 picking up a part A in FIG. 18, and generates an observation movement path curve 250 corresponding to the action of the operator 800 picking up a part A.

Next, in step S202, the similarity computation unit 202 selects an unselected learning movement path curve 150 from among learning movement path curves 150 that are compared with the observation movement path curve 250.

Next, in step S203, the shape similarity computation unit 2021 computes the shape similarity between the observation movement path curve 250 and the learning movement path curve 150 selected in step S202.

The shape similarity computation unit 2021 places the observation movement path curve 250 and the learning movement path curve 150 in the same coordinate space, for example.

Then, the shape similarity computation unit 2021 normalizes the observation movement path curve 250 and the learning movement path curve 150 with respect to time in a similar manner to (b) of FIG. 8. Specifically, the shape similarity computation unit 2021 performs time alignment and time expansion/contraction on the observation movement path curve 250 and the learning movement path curve 150. That is, the shape similarity computation unit 2021 performs time expansion/contraction on the observation movement path curve 250 and the learning movement path curve 150 so that the starting point times and end point times of the observation movement path curve 250 and the learning movement path curve 150 coincide with each other.

Next, the shape similarity computation unit 2021 now performs normalization with respect to position on the observation movement path curve 250 and the learning movement path curve 150, which have been normalized with respect to time. The way of normalization with respect to position is not limited. For example, only the coordinates of the start points of the curves may be made to coincide with each other or the start points and end points of the curves may be made to coincide with each other and intermediate portions may all be expanded or contracted by the same rate. An optimal expansion/contraction rate may be determined for each curve component and the curves may be expanded or contracted by the rate.

The shape similarity computation unit 2021 further determines the difference in distance in the y-axis direction for each pair of corresponding plot points on the observation movement path curve 250 and the learning movement path curve 150 after normalization with respect to time and position. The shape similarity computation unit 2021 performs computation of the difference in distance in the y-axis direction for all the pairs of plot points, and computes the shape similarity for each curve component between the observation movement path curve 250 and the learning movement path curve 150.

Next, in step S204, the position similarity computation unit 2022 computes the position similarity between the observation movement path curve 250 and the learning movement path curve 150 selected in step S202.

The position similarity computation unit 2022 places the observation movement path curve 250 and the learning movement path curve 150 in the same coordinate space and normalizes the observation movement path curve 250 and the learning movement path curve 150 with respect to time, as in step S203, for example. Then, the position similarity computation unit 2022 computes the distance in the y-axis direction between a plot point on the observation movement path curve 250 and the corresponding plot point on the learning movement path curve 150. The inference apparatus 200 performs computation of the distance in the y-axis direction between plot points for all pairs of plot points, and computes the position similarity for each curve component between the observation movement path curve 250 and the learning movement path curve 150.

Note that step S203 and step S204 may be interchanged in order.

Next, in step S205, the significance level setting unit 2031 sets the speed significance level ce for the learning movement path curve 150.

The significance level setting unit 2031 may also directly use the speed coefficient value 170 (speed coefficient value cd) included in the learning path data 300 as the speed significance level ce. The significance level setting unit 2031 may also perform an operation on the speed coefficient value 170 (speed coefficient value cd) and use the value obtained by the operation as the speed significance level ce.

Here, for the simplicity of description, the significance level setting unit 2031 is assumed to directly use the speed coefficient value 170 (speed coefficient value cd) as the speed significance level ce.

Next, in step S206, the significance level setting unit 2031 sets the distribution significance level pe for the learning movement path curve 150.

The significance level setting unit 2031 may also directly use the distribution coefficient value 180 (distribution coefficient value pd) included in the learning path data 300 as the distribution significance level pe. The significance level setting unit 2031 may also perform an operation on the distribution coefficient value 180 (distribution coefficient value pd) and use the value obtained by the operation as the distribution significance level pe.

Here, for the simplicity of description, the significance level setting unit 2031 is assumed to directly use the distribution coefficient value 180 (distribution coefficient value pd) as the distribution significance level pe.

Note that step S205 and step S206 may be interchanged in order.

Next, in step S207, the label output unit 2032 computes the conformity between the observation movement path curve 250 and the learning movement path curve 150.

Figure 13:
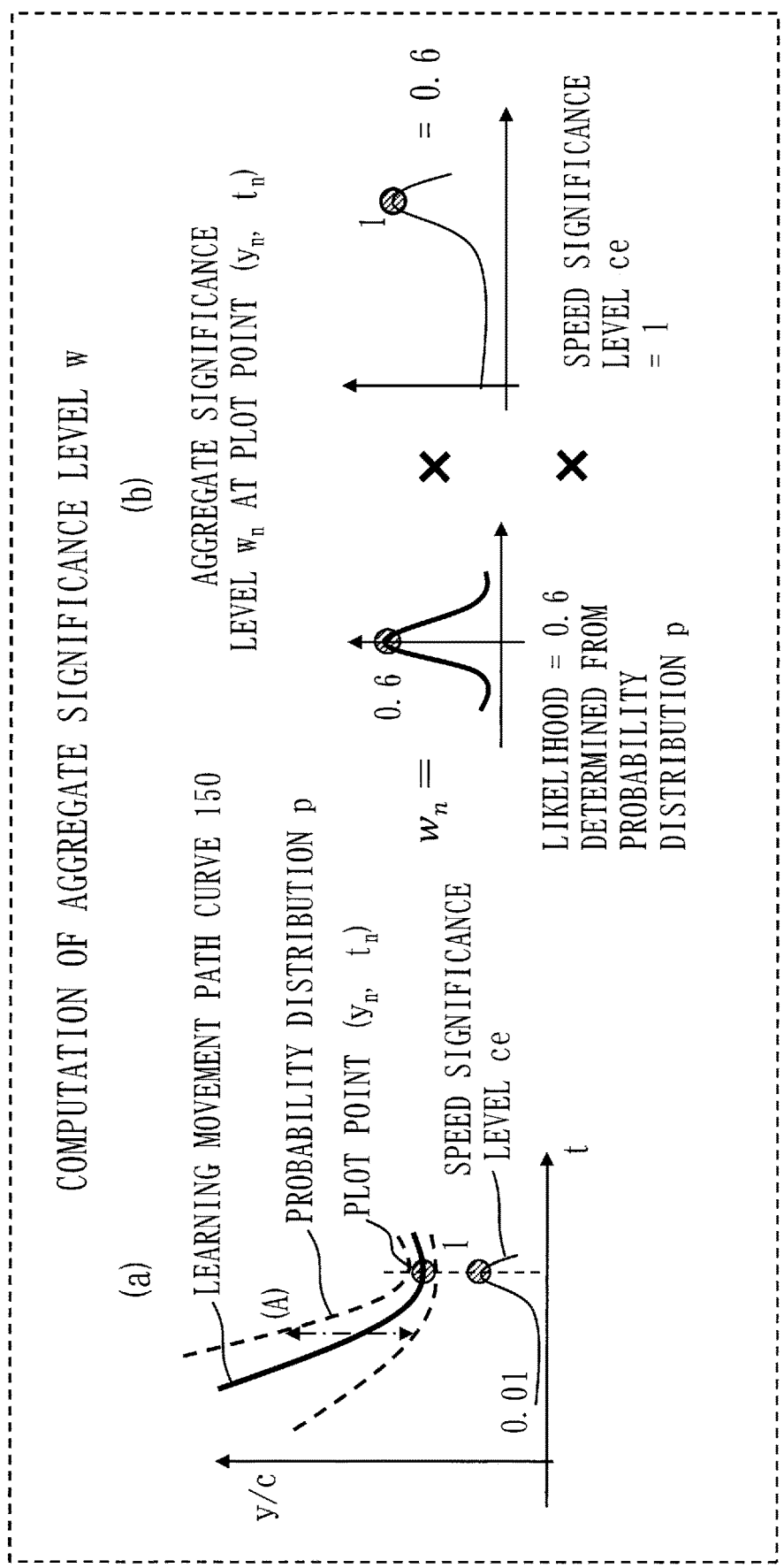
FIG. 13 shows a computation example of aggregate significance level according to Embodiment 1.

Details of step S207 are described with FIGS. 13 and 14.

First, as shown in FIG. 13, the label output unit 2032 computes an aggregate significance level w.

(a) of FIG. 13 shows an example of the probability distribution p and the speed significance level ce for the learning movement path curve 150.

An example of computing an aggregate significance level $w_n$ at a plot point $(y_n, t_n)$, which is one of the curve components, is described here.

Assume that the likelihood at the plot point $(y_n, t_n)$ determined from the probability distribution p is 0.6. That is, the distribution significance level pe at the plot point $(y_n, t_n)$ is 0.6. Assume that, on the other hand, the speed significance level ce at the plot point $(y_n, t_n)$ is 1.

The label output unit 2032 multiples 0.6, which is the distribution significance level pe at the plot point $(y_n, t_n)$, by 1, which is the speed significance level ce at the plot point $(y_n, t_n)$, to determine the aggregate significance level $w_n$ at the plot point $(y_n, t_n)$ as 0.6.

The label output unit 2032 computes the aggregate significance level w in this manner for all of the plot points.

Although herein the label output unit 2032 multiplies the distribution significance level pe and the speed significance level ce, the label output unit 2032 may determine the aggregate significance level w by other kinds of operation.

Also, the label output unit 2032 may use only either one of the distribution significance level pe and the speed significance level ce without determining the aggregate significance level w.

Next, the label output unit 2032 computes a conformity P according to the equation shown in FIG. 14.

That is, the label output unit 2032 multiples the position similarity of each plot point by the aggregate significance level w of that plot point, and multiplies the shape similarity of the plot point by the value obtained by subtracting the aggregate significance level w of the plot point from 1, for each plot point. The label output unit 2032 then adds the two products. The label output unit 2032 performs these calculations on all the plot points and sums the resulting values to compute the conformity P between the learning movement path curve 150 and the observation movement path curve 250.

Next, in step S208 of FIG. 12, the similarity computation unit 202 determines whether or not there is an unselected learning movement path curve 150 among the multiple learning movement path curves 150 that are to be compared with the observation movement path curve 250.

If there is an unselected learning movement path curve 150, processing returns to step S202.

On the other hand, if all of the learning movement path curves 150 have been selected, processing continues to step S209.

In step S209, the label output unit 2032 selects the label of the learning movement path curve 150 with the highest conformity P from the multiple learning movement path curves 150 and outputs the selected label.

*Description of Effects of the Embodiment*

As described above, according to this embodiment, the inference apparatus 200 can correctly recognize the type of movement represented by multiple pieces of image data 600. Thus, according to this embodiment, the inference apparatus 200 can correctly recognize the movement type even when there are two or more learning movement path curves that are similar to each other in shape.

This embodiment described that the significance level setting unit 2031 computes the distribution significance level pe and the speed significance level ce. Also, it was described that the label output unit 2032 computes the aggregate significance level w and computes the conformity P according to the equation shown in FIG. 14; however, the way of computing the conformity P is not limited thereto.

For example, computation of the distribution significance level pe and the speed significance level ce may be omitted instead. In that case, the label output unit 2032 computes the conformity P only by addition of the position similarity and the shape similarity. That is, the label output unit 2032 computes the conformity P omitting w(y, t) and (1−w(y, t)) in the equation of FIG. 14.

Alternatively, the position similarity computation unit 2022 may directly compare a curve component (plot point) of the observation movement path curve 250 with the corresponding probability distribution p and compute the position similarity. In this case, w(y, t) and (1−w(y, t)) may be or may not be omitted in the equation of FIG. 14.

Also, this embodiment described the example where the significance level setting unit 2031 sets the speed significance level ce based on the speed coefficient value 170 and sets the distribution significance level pe based on the distribution coefficient value 180.

Alternatively, the significance level setting unit 2031 may set the speed significance level ce not on the basis of the speed coefficient value 170 and set the distribution significance level pe not on the basis of the distribution coefficient value 180.

In this case, the learning path data generation unit 1023 adds the multiple basic movement path curves 140 that have been used in the generation of the learning movement path curve 150 to the learning path data 300. In this case, the speed coefficient value setting unit 1021 and the distribution coefficient value setting unit 1022 would be unnecessary. Also, the speed coefficient value 170 and the distribution coefficient value 180 are not included in the learning path data 300. Then, the significance level setting unit 2031 derives the movement speed of the object from the learning movement path curve 150, and computes the speed significance level ce in a similar procedure to the computation procedure of the speed coefficient value cd at the speed coefficient value setting unit 1021. Also, the significance level setting unit 2031 analyzes the probability distribution p of the multiple basic movement path curves 140 included in the learning path data 300 and computes the distribution significance level pe in a similar procedure to the computation procedure of the distribution coefficient value pd at the distribution coefficient value setting unit 1022.

Embodiment 2

This embodiment primarily describes differences from Embodiment 1.

Matters that are not discussed below are similar to Embodiment 1.

Figure 15:
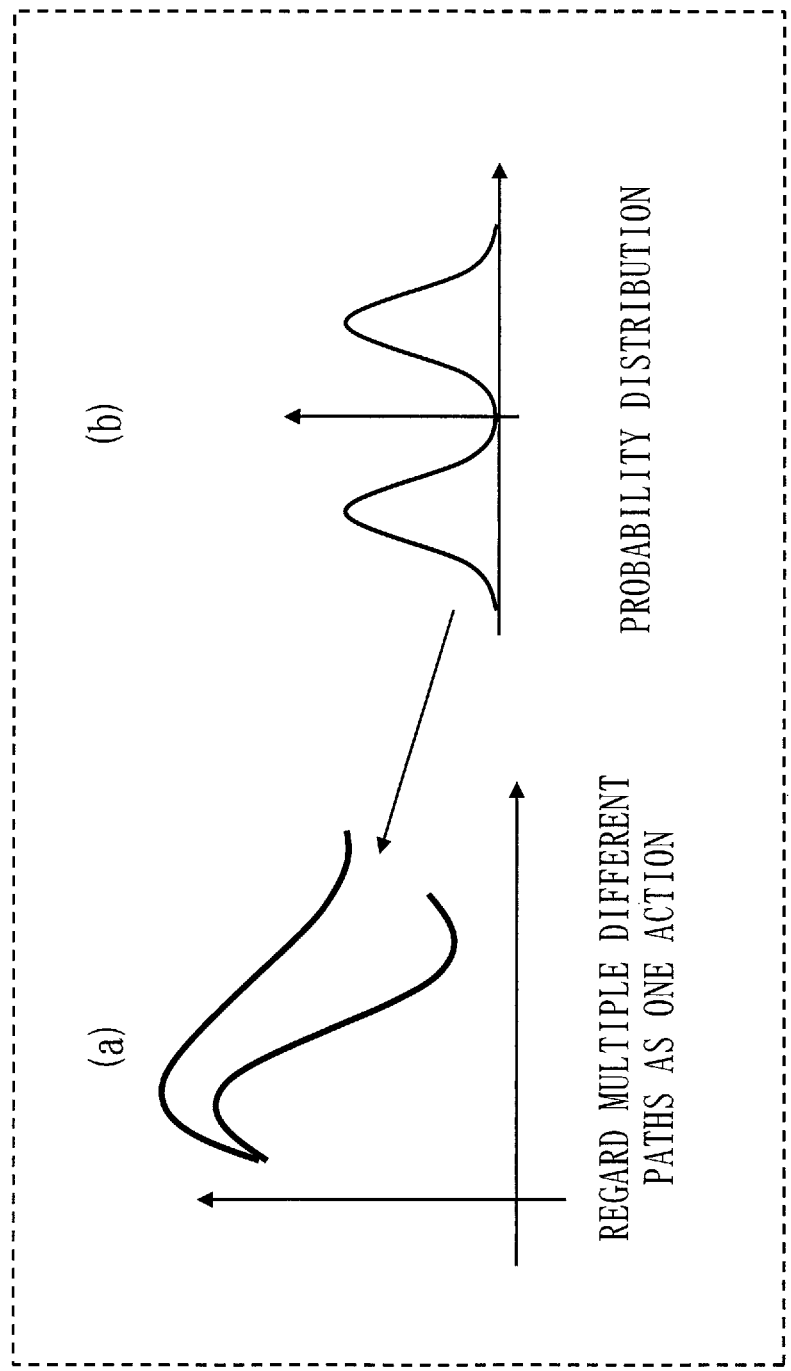
FIG. 15 shows an example of a multimodal probability distribution according to Embodiment 2.

In this embodiment, an example of using a multimodal probability distribution p, illustrated in (b) of FIG. 15, as the probability distribution p of the basic movement path curves 140 is described.

When two different movement paths can be included in a single action as in (a) of FIG. 15, it is useful to use the multimodal probability distribution p illustrated in (b) of FIG. 15.

In this embodiment, the distribution coefficient value setting unit 1022 of the learning apparatus 100 sets the distribution coefficient value pd for a curve component (plot point) of the learning movement path curve 150 based on the multimodal probability distribution of the curve component. The probability distributions of all of the curve components (plot points) of the learning movement path curve 150 may be multimodal or only probability distributions of some of the curve components (plot points) may be multimodal.

Also, in this embodiment, the label output unit 2032 of the inference apparatus 200 sets the distribution significance level pe at any curve component (plot point) of the learning movement path curve 150 based on the multimodal probability distribution of the curve component.

In this manner, according to this embodiment, use of multimodal probability distribution enables the inference apparatus 200 to correctly recognize an action that may contain a complicated movement path.

Embodiment 3

This embodiment primarily describes differences from Embodiment 1.

Matters that are not discussed below are similar to Embodiment 1.

This embodiment will illustrate an example of analyzing not only the shape of a movement path curve but heading direction.

In Embodiment 1, if the observation movement path curve 250 instantaneously approaches the learning movement path curve 150 at a plot point, incorrect recognition tends to occur because the similarity in position at that plot point becomes high.

Figure 16:
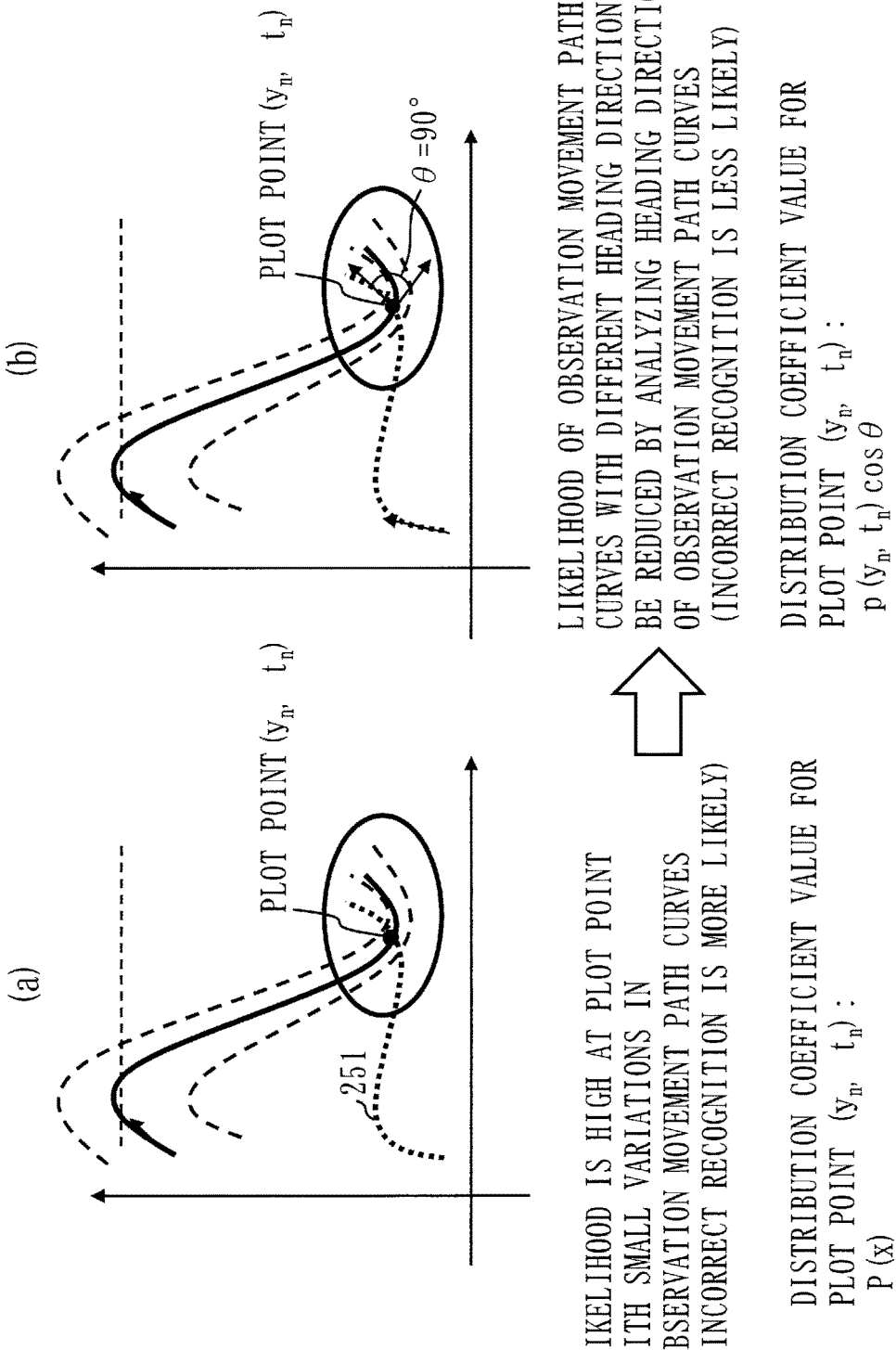
FIG. 16 shows a computation example of a distribution coefficient value according to Embodiment 3.

For example, as shown in (a) of FIG. 16, in a section far from the plot point $(y_n, t_n)$, the observation movement path curve 251 is largely separated from the learning movement path curve 150 and the other basic movement path curves 140. However, at the plot point $(y_n, t_n)$, the observation movement path curve 251 intersects the learning movement path curve 150. At the plot point $(y_n, t_n)$, variations among all the basic movement path curves 140, including the observation movement path curve 251, are small. Accordingly, the similarity is higher at the plot point $(y_n, t_n)$. However, since the observation movement path curve 251 as a whole has a significantly different curve shape from the other basic movement path curves 140, it is desirable to reduce the influence of the position similarity of the observation movement path curve 251 at the plot point $(y_n, t_n)$.

Thus, in this embodiment, the significance level setting unit 2031 corrects the distribution significance level pe at the plot point $(y_n, t_n)$ based on the heading direction at the plot point $(y_n, t_n)$ of the learning movement path curve 150 and of the observation movement path curve 251.

In this manner, in this embodiment, the significance level setting unit 2031 utilizes the heading direction of the observation movement path curve 251 in the correction of the distribution significance level pe. This can reduce the influence of position similarity of an observation movement path curve 251 that partially coincides with the learning movement path curve 150 in position and can make incorrect recognitions less likely to occur.

As shown in (b) of FIG. 16, for example, the significance level setting unit 2031 computes the distribution significance level pe at the plot point $(y_n, t_n)$ in accordance with the following.

$$p(y_n, t_n) \cos \theta$$

Since the angle formed between the learning movement path curve 150 and the observation movement path curve 251 is 90° in the example of (b) of FIG. 16, the distribution significance level pe becomes 0 as indicated below.

$$p(y_n, t_n) \cos 90° = p(y_n, t_n) \times 0 = 0.$$

The way of computing the distribution significance level pe by the significance level setting unit 2031 is not limited to the foregoing.

Further, the heading direction of the observation movement path curve 251 may be the heading direction in a tangential direction of the observation movement path curve 251 or an average heading direction over a certain section.

In a case where the distribution coefficient value setting unit 1022 does not compute the distribution coefficient value pd, that is, when the significance level setting unit 2031 computes the distribution significance level pe not based on the distribution coefficient value pd but by analyzing the probability distribution p of multiple basic movement path curves 140, the significance level setting unit 2031 still can compute the distribution significance level pe at the plot point $(y_n, t_n)$ in a similar procedure to the computation procedure of the distribution coefficient value pd described above.

According to this embodiment, by such an analysis including the heading direction of the observation movement path curve as well, the inference apparatus 200 can correctly recognize an action even when the observation movement path curve instantaneously approaches the learning movement path curve 150 at a plot point.

Embodiment 4

This embodiment primarily describes differences from Embodiment 1.

Matters that are not discussed below are similar to Embodiment 1.

In this embodiment, the inference apparatus 200 does not compute position similarity if multiple learning movement path curves 150 are not similar to each other in shape and it is not necessary to compute position similarity.

More specifically, in this embodiment, the inference apparatus 200 computes the shape similarity between two or more learning movement path curves 150 that are to be compared to the observation movement path curve 250. Then, if the shape similarity between the two or more learning movement path curves 150 is greater than or equal to a threshold value, the inference apparatus 200 computes position similarity and shape similarity. On the other hand, if the shape similarity between the two or more learning movement path curves 150 is less than the threshold value, the inference apparatus 200 only computes shape similarity.

Figure 17:
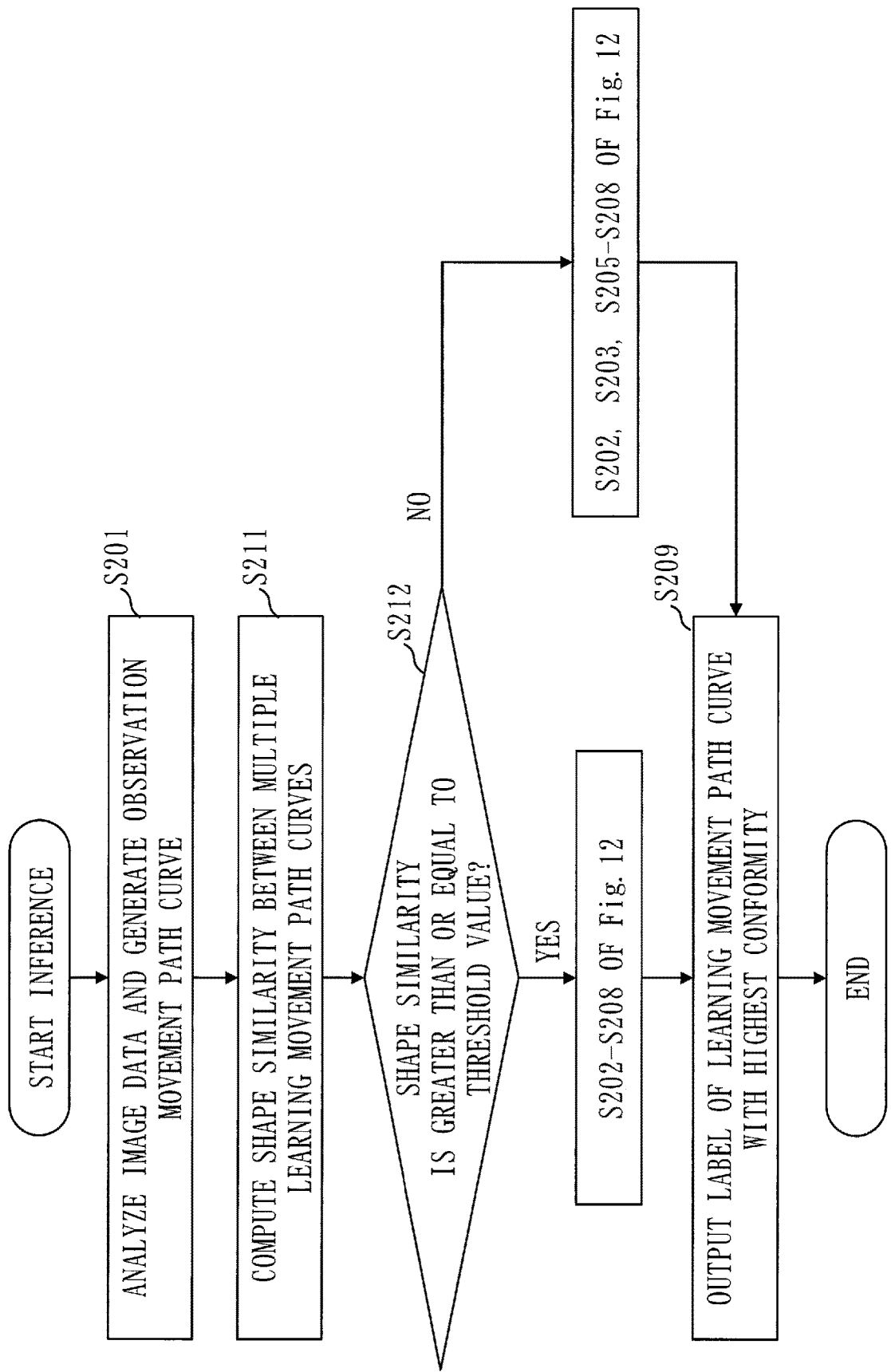
FIG. 17 is a flowchart illustrating an exemplary operation of an inference apparatus according to Embodiment 4.

FIG. 17 shows an exemplary operation of the inference apparatus 200 according to this embodiment.

For the simplicity of description, the following will illustrate a case where there are two learning movement path curves 150 that are to be compared to the observation movement path curve 250.

After the observation movement path curve 250 is generated in step S201, the shape similarity computation unit 2021 computes the shape similarity between the two learning movement path curves 150 in step S211.

The computation procedure of the shape similarity in step S211 is similar to the computation procedure for step S203 described in Embodiment 1. In step S203, the shape similarity computation unit 2021 computes the shape similarity between the learning movement path curve 150 and the observation movement path curve 250, whereas in step S211, the shape similarity computation unit 2021 computes the shape similarity between the two learning movement path curves 150.

When the shape similarity between the two learning movement path curves 150 is greater than or equal to a threshold value (YES in step S212), steps S202 to S208 shown in FIG. 12 are performed. That is, when the shape similarity between the two learning movement path curves 150 is greater than or equal to the threshold value, position similarity is also computed in addition to the shape similarity between the observation movement path curve 250 and the learning movement path curves 150.

On the other hand, when the shape similarity between the two learning movement path curves 150 is less than the threshold value (NO in step S212), steps S202, S203, and S205 to S208 are performed. That is, when the shape similarity between the two learning movement path curves 150 is less than the threshold value, the shape similarity between the observation movement path curve 250 and the learning movement path curves 150 is computed but the position similarity is not computed.

As step S209 is the same as that in shown in Embodiment 1, description of it is omitted.

When there are three or more learning movement path curves 150 that are to be compared to the observation movement path curve 250, the shape similarity computation unit 2021 computes the shape similarities of the three or more learning movement path curves 150 to each other.

If the shape similarity is greater than or equal to a threshold value for one or more pairs of learning movement path curves 150, steps S202 to S208 shown in FIG. 12 are performed.

On the other hand, if the shape similarity is less than the threshold value for all the pairs of learning movement path curves 150, steps S202, S203, and S205 to S208 are performed.

As described above, in this embodiment, the inference apparatus 200 does not compute position similarity when multiple learning movement path curves 150 are not similar to each other in shape and it is not necessary to compute position similarity.

Accordingly, this embodiment can avoid reduction in recognition accuracy that would arise from computation of position similarity when it is not necessary to compute position similarity.

The computation process of shape similarity in step S211 may be carried out in the learning apparatus 100. Specifically, processing at step S211 may be performed after step S103 of FIG. 11, the labels of movement paths with similar shapes may be kept, and information on the labels of movement paths with similar shapes that have been kept may be utilized in inference instead of step S211.

Embodiment 5

This embodiment primarily describes differences from Embodiment 1.

Matters that are not discussed below are similar to Embodiment 1.

In this embodiment, the conformity computation unit 203 obtains additional data that can be used in computation of conformity, in addition to shape similarity and position similarity. Then, the conformity computation unit 203 uses the additional data to compute the conformity.

The additional data can be any kind of data that is added to shape similarity, position similarity, and aggregate significance level. For example, the conformity computation unit 203 may acquire the image data 600 and the image data 400 that has been used in generation of basic movement path curves 140 as additional data.

In this case, the significance level setting unit 2031 compares the image data 600 with the image data 400. If the image data 600 and the image data 400 are similar, the significance level setting unit 2031 adds a prescribed numerical value to the aggregate significance level. On the other hand, if the image data 600 and the image data 400 are not similar, the significance level setting unit 2031 subtracts a prescribed numerical value from the aggregate significance level.

For instance, if the image data 600 is image data for an action of moving an electric driver and the image data 400 is image data for an action of moving a spanner, the two pieces of image data will not be similar. In this case, the significance level setting unit 2031 subtracts a prescribed numerical value from the aggregate significance level. Criteria for determining the similarity between the image data 600 and the image data 400 can be arbitrarily determined by the user of the inference apparatus 200.

The additional data is not limited to image data 600 and image data 400. The additional data may be sensor data resulting from observing movement of an object or other kind of data.

As has been described above, this embodiment can improve recognition accuracy by using additional data.

While Embodiments 1 to 5 have been described above, two or more of these embodiments may be practiced in combination.

Alternatively, one of these embodiments may be practiced in part.

Alternatively, two or more of these embodiments may be practiced in partial combination.

Further, configurations and procedures described in these embodiments may be modified as necessary.

\*\*\*Additional Description on Hardware Configuration\*\*\*

Finally, the hardware configurations of the learning apparatus 100 and the inference apparatus 200 are additionally described.

A processor 911 shown in FIG. 3 is an IC (Integrated Circuit) that performs processing.

The processor 911 is a CPU (Central Processing Unit), DSP (Digital Signal Processor), or the like.

The main storage device 912 shown in FIG. 3 is a RAM (Random Access Memory).

The secondary storage device 913 shown in FIG. 3 is a ROM (Read Only Memory), a flash memory, an HDD (Hard Disk Drive), or the like.

The communication device 914 shown in FIG. 3 is an electronic circuit that executes communication processing for data.

The communication device 914 is a communication chip or a NIC (Network Interface Card), for example.

The secondary storage device 913 also stores an OS (Operating System).

At least a portion of the OS is then executed by the processor 911.

The processor 911 executes the program for implementing the functions of the learning movement path curve generation unit 101 and the coefficient value setting unit 102 while executing at least a portion of the OS.

Through the execution of the OS by the processor 911, task management, memory management, file management, communication control, and the like are performed.

At least any of information, data, signal values, and variable values indicating the results of processing by the learning movement path curve generation unit 101 and the coefficient value setting unit 102 are stored in at least any of the main storage device 912, the secondary storage device 913, and a register and a cache memory in the processor 911.

The programs for implementing the functions of the learning movement path curve generation unit 101 and the coefficient value setting unit 102 may be stored in a portable recording medium such as a magnetic disk, a flexible disk, an optical disk, a compact disk, Blu-ray (registered trademark) disk, and a DVD. Then, the portable recording medium storing the programs for implementing the functions of the learning movement path curve generation unit 101 and the coefficient value setting unit 102 may be distributed.

The "units" of the learning movement path curve generation unit 101 and the coefficient value setting unit 102 may be read as "circuits" or "steps" or "procedures" or "processes" or "circuitry".

The learning apparatus 100 may be implemented by a processing circuit. The processing circuit is a logic IC (Integrated Circuit), a GA (Gate Array), an ASIC (Application Specific Integrated Circuit), or an FPGA (Field-Programmable Gate Array), for example.

In this case, the learning movement path curve generation unit 101 and the coefficient value setting unit 102 are implemented as portions of the processing circuit.

The processor 921 shown in FIG. 5 is an IC that performs processing.

The processor 921 is a CPU, DSP, or the like.

The main storage device 922 shown in FIG. 5 is RAM.

The secondary storage device 923 shown in FIG. 5 is a ROM, a flash memory, an HDD, or the like.

The communication device 924 shown in FIG. 5 is an electronic circuit that executes communication processing for data.

The communication device 924 is a communication chip or a NIC, for example.

The secondary storage device 923 also stores an OS.

At least a portion of the OS is then executed by the processor 921.

The processor 921 executes the program for implementing the functions of the observation movement path curve generation unit 201, the similarity computation unit 202, and the conformity computation unit 203 while executing at least a portion of the OS.

Through the execution of the OS by the processor 921, task management, memory management, file management, communication control, and the like are performed.

At least any of information, data, signal values, and variable values indicating the results of processing by the observation movement path curve generation unit 201, the similarity computation unit 202, and the conformity computation unit 203 are stored in at least any of the main storage device 922, the secondary storage device 923, and a register and a cache memory in the processor 921.

The programs for implementing the functions of the observation movement path curve generation unit 201, the similarity computation unit 202, and the conformity computation unit 203 may be stored in a portable recording medium such as a magnetic disk, a flexible disk, an optical disk, a compact disk, Blu-ray (registered trademark) disk, and a DVD. Then, the portable recording medium storing the programs for implementing the functions of the observation movement path curve generation unit 201, the similarity computation unit 202, and the conformity computation unit 203 may be distributed.

The "units" of the observation movement path curve generation unit 201, the similarity computation unit 202, and the conformity computation unit 203 may be read as "circuits" or "steps" or "procedures" or "processes" or "circuitry".

The inference apparatus 200 may be implemented by a processing circuit. The processing circuit is a logic IC, a GA, an ASIC, or an FPGA, for example.

In this case, the observation movement path curve generation unit 201, the similarity computation unit 202, and the conformity computation unit 203 are implemented as portions of the processing circuit.

In the present specification, a superordinate concept of processor and processing circuit is referred to as "processing circuitry".

That is, processors and processing circuits are each a specific example of "processing circuitry".

REFERENCE SIGNS LIST

100: learning apparatus; 101: learning movement path curve generation unit; 102: coefficient value setting unit; 1021: speed coefficient value setting unit; 1022: distribution coefficient value setting unit; 1023: learning path data generation unit; 140: basic movement path curve; 150: learning movement path curve; 160: label; 170: speed coefficient value; 180: distribution coefficient value; 200: inference apparatus; 201: observation movement path curve generation unit; 202: similarity computation unit; 2021: shape similarity computation unit; 2022: position similarity computation unit; 203: conformity computation unit; 2031: significance level setting unit; 2032: label output unit; 250: observation movement path curve; 251: observation movement path curve; 300: learning path data; 400: image data; 500: label information; 600: image data; 800: operator; 911: processor; 912: main storage device; 913: secondary storage device; 914: communication device; 921: processor; 922: main storage device; 923: secondary storage device; 924: communication device; 1000: analysis system

The invention claimed is:

1. An inference apparatus comprising:
processing circuitry
to compute, as a shape similarity, a similarity in shape between a learning movement path curve, which is a movement path curve obtained through learning and associated with one of a plurality of labels through the learning, and an observation movement path curve, which is a movement path curve obtained through observation;
to compute, as a position similarity, a similarity in position between the learning movement path curve and the observation movement path curve when the learning movement path curve and the observation movement path curve are placed in a same coordinate space;
to compute a conformity between the learning movement path curve and the observation movement path curve, using the shape similarity and the position similarity; and
to use the computed conformity to classify the observation movement path curve as belong in a classification corresponding to the label out of a plurality of classifications corresponding to the plurality of labels, wherein
the learning movement path curve is divided into a plurality of curve components constituting the learning movement path curve,
the observation movement path curve is divided into a plurality of curve components corresponding to the plurality of curve components of the learning movement path curve, and
the processing circuitry
computes the shape similarity for each pair of corresponding curve components between the learning movement path curve and the observation movement path curve,
computes the position similarity for each pair of corresponding curve components between the learning movement path curve and the observation movement path curve, and
sets a significance level for each curve component of the learning movement path curve based on an attribute of each curve component, and
computes the conformity, using the shape similarity, the position similarity, and the significance level of each curve component.

2. The inference apparatus according to claim 1, wherein
the learning movement path curve is a movement path curve in which a movement path of a moving object is represented, and
the processing circuitry sets the significance level for each curve component based on a movement speed of the object for each curve component, the moving speed being the attribute of each curve component of the learning movement path curve.

3. The inference apparatus according to claim 2, wherein
the processing circuitry sets a higher significance level for a curve component with a lower movement speed of the object.

4. The inference apparatus according to claim 1, wherein
the learning movement path curve is a movement path curve generated by aggregating a plurality of basic movement path curves, and
the processing circuitry sets the significance level for each curve component based on a distribution of the plurality of basic movement path curves for each curve component that would arise when the learning movement path curve and the plurality of basic movement path curves are superimposed in the same coordinate space, the distribution being the attribute of each curve component of the learning movement path curve.

5. The inference apparatus according to claim 4, wherein
the processing circuitry sets a higher significance level for a curve component at which a likelihood that is calculated from the distribution of the plurality of basic movement path curves is higher.

6. The inference apparatus according to claim 1, wherein
the processing circuitry
corrects at least either of the shape similarity and the position similarity for each curve component, using the significance level of the same curve component, and
after making correction using the significance level for each curve component, computes the conformity between the learning movement path curve and the observation movement path curve, using the shape similarity and the position similarity for each curve component.

7. An inference apparatus comprising
processing circuitry
to compute, as a shape similarity, a similarity in shape between a learning movement path curve which is a movement path curve obtained through learning and an observation movement path curve which is a movement path curve obtained through observation;
to compute, as a position similarity, a similarity in position between the learning movement path curve and the observation movement path curve when the learning movement path curve and the observation movement path curve are placed in a same coordinate space; and
to compute a conformity between the learning movement path curve and the observation movement path curve, using the shape similarity and the position similarity, wherein
the learning movement path curve is divided into a plurality of curve components constituting the learning movement path curve,
the observation movement path curve is divided into a plurality of curve components corresponding to the plurality of curve components of the learning movement path curve, the processing circuitry
computes the shape similarity for each pair of corresponding curve components between the learning movement path curve and the observation movement path curve,
computes the position similarity for each pair of corresponding curve components between the learning movement path curve and the observation movement path curve, and
sets a significance level for each curve component of the learning movement path curve based on an attribute of each curve component, and
computes the conformity, using the shape similarity, the position similarity, and the significance level of each curve component,
the learning movement path curve is a movement path curve in which a movement path of a moving object is represented, and
the processing circuitry
computes the shape similarity between each of a plurality of learning movement path curves and the observation movement path curve,
computes the position similarity between each of the plurality of learning movement path curves and the observation movement path curve,
and computes the conformity between each of the plurality of learning movement path curves and the observation movement path curve, using the shape similarity and the position similarity computed between each of the plurality of learning movement path curves and the observation movement path curve, and selects a learning movement path curve having a highest conformity with the observation movement path curve from among the plurality of learning movement path curves based on a result of computations of the conformity.

8. The inference apparatus according to claim 4, wherein the processing circuitry sets the significance level for a curve component of the learning movement path curve based on a multimodal distribution of the plurality of basic movement path curves at the curve component.

9. The inference apparatus according to claim 4, wherein the processing circuitry sets the significance level for a curve component of the learning movement path curve based on a distribution of the plurality of basic movement path curves for the curve component and on a heading direction of at least any basic movement path curve of the plurality of basic movement path curves for the curve component.

10. The inference apparatus according to claim 7, wherein the processing circuitry
computes the shape similarity between the plurality of learning movement path curves, and
computes the position similarity between each of the plurality of learning movement path curves and the observation movement path curve if the shape similarity between the plurality of learning movement path curves is greater than or equal to a threshold value.

11. The inference apparatus according to claim 1, wherein the processing circuitry
obtains additional data that can be used in computation of the conformity between the learning movement path curve and the observation movement path curve in addition to the shape similarity and the position similarity, and
uses the additional data to compute the conformity between the learning movement path curve and the observation movement path curve.

12. A learning apparatus comprising:
processing circuitry
to generate a learning movement path curve through learning, the learning movement path curve being a movement path curve to be divided into a plurality of curve components; and
to set a coefficient value for each curve component of the learning movement path curve based on an attribute of each curve component, wherein
the processing circuitry
generates the learning movement path curve by aggregating a plurality of basic movement path curves, and
sets the coefficient value for each curve component based on a distribution of the plurality of basic movement path curves for each curve component that would arise when the learning movement path curve and the plurality of basic movement path curves are superimposed in a same coordinate space, the distribution being the attribute of each curve component of the learning movement path curve.

13. The learning apparatus according to claim 12, wherein the processing circuitry
generates a movement path curve in which a movement path of a moving object is represented as the learning movement path curve, and
sets the coefficient value for each curve component based on a movement speed of the object for each curve component, the moving speed being the attribute of each curve component of the learning movement path curve.

14. The learning apparatus according to claim 13, wherein the processing circuitry sets a higher coefficient value for a curve component with a lower movement speed of the object.

15. The learning apparatus according to claim 14, wherein the processing circuitry sets a higher coefficient value for a curve component at which a likelihood that is calculated from the distribution of the plurality of basic movement path curves is higher.

16. The learning apparatus according to claim 14, wherein the processing circuitry sets the coefficient value for a curve component of the learning movement path curve based on a multimodal distribution of the plurality of basic movement path curves at the curve component.

* * * * *